United States Patent [19]
Wilcox et al.

[11] Patent Number: 5,994,885
[45] Date of Patent: Nov. 30, 1999

[54] CONTROL CIRCUIT AND METHOD FOR MAINTAINING HIGH EFFICIENCY OVER BROAD CURRENT RANGES IN A SWITCHING REGULATOR CIRCUIT

[75] Inventors: Milton E. Wilcox, Saratoga; Randy G. Flatness, Los Gatos, both of Calif.

[73] Assignee: Linear Technology Corporation, Milpitas, Calif.

[21] Appl. No.: 08/978,167

[22] Filed: Nov. 25, 1997

Related U.S. Application Data

[62] Division of application No. 08/799,467, Feb. 13, 1997, Pat. No. 5,731,694, which is a continuation of application No. 08/634,688, Apr. 18, 1996, abandoned, which is a continuation of application No. 08/476,232, Jun. 7, 1995, abandoned, which is a division of application No. 08/036,047, Mar. 23, 1993, Pat. No. 5,481,178.

[51] Int. Cl.$^6$ ........................................................ G05F 1/40
[52] U.S. Cl. ........................... 323/285; 323/287; 323/283; 323/290
[58] Field of Search ..................... 323/285, 283, 323/224, 290, 287, 284, 268, 275

[56] References Cited

U.S. PATENT DOCUMENTS

| | | |
|---|---|---|
| 3,458,798 | 7/1969 | Fang et al. . |
| 3,571,697 | 3/1971 | Phillips . |
| 3,579,091 | 5/1971 | Clarke et al. . |
| 3,581,186 | 5/1971 | Weinberger . |
| 3,582,758 | 6/1971 | Gunn . |
| 3,585,491 | 6/1971 | Petersen . |
| 3,733,540 | 5/1973 | Hawkins . |
| 3,772,588 | 11/1973 | Kelly et al. ............................. 323/285 |
| 3,784,893 | 1/1974 | Rando . |

(List continued on next page.)

FOREIGN PATENT DOCUMENTS

| | | |
|---|---|---|
| 0 428 377 A2 | 5/1991 | European Pat. Off. . |
| 60-32565 | 2/1985 | Japan . |
| 60-156269 | 8/1985 | Japan . |
| 63-307510 | 12/1988 | Japan . |
| 3-113986 | 11/1991 | Japan . |
| 4-42771 | 2/1992 | Japan . |
| 4-49844 | 2/1992 | Japan . |
| 4-101286 | 9/1992 | Japan . |
| 4-128086 | 11/1992 | Japan . |

OTHER PUBLICATIONS

Linear Technology Corporation, "New Device Cameos," *Linear Technology Magazine*, 10:18–19 (1992).
Williams, J. and Huffman, B., "Proper instrumentation eases low power dc/dc converter design," EDN, Oct. 27, 1988.
Chryssis, George, "High–frequency switching power supplies," pp. 144–152 and 180–181, McGraw–Hill, 1989.
Hnatek, Eugene R., "Design of Solid State Power Supplies," Third Edition, pp. 65–70, Van Nostrand Reinhold, 1989.
Linear Technology, "LT1846/1847, LT3846/3847 Current Mode PWM Controller," Datasheet, 1990.
Huffman, B., "Efficiency and Power Characteristics of Switching Regulator Circuits," Application Note 46, Linear Technology, Nov. 1991.
Gold, S., "Design Techniques for Electrostatic Discharge Protection," Linear Technology, Oct. 1992.
Unitrode, "UC1846/7, UC2846/7, UC3846/7 Current Mode PWM Controller," Datasheet, dated Jan. 1997 (date of first publication unknown).

(List continued on next page.)

*Primary Examiner*—Peter S. Wong
*Assistant Examiner*—Rajnikant B. Patel
*Attorney, Agent, or Firm*—Fish & Neave

[57] ABSTRACT

A circuit and method for controlling a switching voltage regulator having (1) a switch including one or more switching transistors and (2) an output adapted to supply current at a regulated voltage to a load including an output capacitor. The circuit and method generates a control signal to turn said one or more switching transistors OFF under operating conditions when the voltage at the output is capable of being maintained substantially at the regulated voltage by the charge on the output capacitor. Such a circuit and method increases the efficiency of the regulator circuit particularly at low average current levels.

42 Claims, 10 Drawing Sheets

U.S. PATENT DOCUMENTS

| | | |
|---|---|---|
| 3,863,128 | 1/1975 | Wilwerding . |
| 3,879,647 | 4/1975 | Hamilton et al. . |
| 3,992,638 | 11/1976 | Sauvanet . |
| 4,013,939 | 3/1977 | Biess et al. . |
| 4,035,710 | 7/1977 | Joyce . |
| 4,071,884 | 1/1978 | Maigret . |
| 4,160,288 | 7/1979 | Stuart et al. . |
| 4,326,245 | 4/1982 | Saleh . |
| 4,395,675 | 7/1983 | Toumani . |
| 4,428,015 | 1/1984 | Nesler . |
| 4,462,069 | 7/1984 | Becky . |
| 4,479,174 | 10/1984 | Cates . |
| 4,493,017 | 1/1985 | Kammiller et al. . |
| 4,519,024 | 5/1985 | Federico et al. . |
| 4,541,041 | 9/1985 | Park et al. ............................... 363/41 |
| 4,554,499 | 11/1985 | Sherman et al. . |
| 4,578,630 | 3/1986 | Grosch . |
| 4,610,521 | 9/1986 | Inoue . |
| 4,634,956 | 1/1987 | Davis et al. ............................ 323/222 |
| 4,672,303 | 6/1987 | Newton . |
| 4,672,518 | 6/1987 | Murdock . |
| 4,674,020 | 6/1987 | Hill . |
| 4,683,529 | 7/1987 | Bucher, II . |
| 4,706,177 | 11/1987 | Josephson . |
| 4,709,315 | 11/1987 | Ramos . |
| 4,712,169 | 12/1987 | Albach . |
| 4,716,514 | 12/1987 | Patel . |
| 4,727,308 | 2/1988 | Huljak et al. . |
| 4,754,385 | 6/1988 | McDade et al. . |
| 4,801,859 | 1/1989 | Dishner . |
| 4,813,066 | 3/1989 | Holtz et al. . |
| 4,814,684 | 3/1989 | McCurdy . |
| 4,819,122 | 4/1989 | Gontowski, Jr. . |
| 4,823,070 | 4/1989 | Nelson . |
| 4,843,532 | 6/1989 | Freedman . |
| 4,866,587 | 9/1989 | Wadlington . |
| 4,870,555 | 9/1989 | White . |
| 4,884,183 | 11/1989 | Sable ....................................... 363/41 |
| 4,902,957 | 2/1990 | Cassani et al. . |
| 4,922,404 | 5/1990 | Ludwig et al. . |
| 4,928,200 | 5/1990 | Redl et al. . |
| 4,929,882 | 5/1990 | Szepesi . |
| 4,931,716 | 6/1990 | Jovanovic et al. . |
| 4,996,638 | 2/1991 | Orr . |
| 5,028,861 | 7/1991 | Pace et al. . |
| 5,034,871 | 7/1991 | Okamoto et al. . |
| 5,066,900 | 11/1991 | Bassett . |
| 5,068,575 | 11/1991 | Dunsmore et al. . |
| 5,081,411 | 1/1992 | Walker . |
| 5,097,196 | 3/1992 | Schoneman . |
| 5,128,603 | 7/1992 | Wölfel . |
| 5,134,355 | 7/1992 | Hastings . |
| 5,138,249 | 8/1992 | Capel . |
| 5,144,547 | 9/1992 | Masamoto . |
| 5,170,333 | 12/1992 | Niwayama . |
| 5,177,676 | 1/1993 | Inam et al. ............................... 363/80 |
| 5,179,511 | 1/1993 | Troyk et al. . |
| 5,184,129 | 2/1993 | Fung et al. . |
| 5,193,211 | 3/1993 | Nobusawa . |
| 5,237,606 | 8/1993 | Ziermann . |
| 5,309,078 | 5/1994 | Cameron ............................... 318/811 |
| 5,396,412 | 3/1995 | Barlage . |
| 5,408,162 | 4/1995 | Williams . |
| 5,481,178 | 1/1996 | Wilcox et al. ......................... 323/287 |
| 5,548,189 | 8/1996 | Williams . |

OTHER PUBLICATIONS

Cassani, John C.; Hodgins, Jonathan J.; Robert G. and Wittlinger, H.A., "Sophisticated Control IC Enhances 1 MHZ Current Controlled Regulator Performance," Proceedings of HFPC, pp. 167–173, May 1992.

Lee, et al., "Design of Switching Regulator with Combined FM and On–Off Control," IEEE Transactions on Aerospace and Electronic Systems, vol. AES–22, No. 6, pp. 725–731, Nov. 1986.

Harris Semiconductor, "HIP 5060 Power Control IC Single Chip Power Supply", Preliminary Datasheet, Jan. 1992.

Linear Technology, Williams, J. et al., App. Note 29, "Some Thoughts on DC–DC Converters," Oct. 1988.

Linear Technology, Williams, J., App. Note 35, "Step Down Switching Regulators," Aug. 1989.

Linear Technology, "LT1432 5V High Efficiency Step–Down Switching Regulator Controller," Datasheet, 1992.

Maxim Integrated Products, "MAX782/MAX786 Notebook Computer Power Supplies," Advance Information Datasheet, Feb. 1993.

Micro Linear, "ML4873 Battery Power Control IC," Advance Informatio Datasheet, Mar. 15, 1993.

Unitrode, "UC1895, UC2895, UC3895 Synchronous Rectifier Buck PWM Controller," Advance Information Datasheet, Oct. 5, 1992.

Archer, William R., "Current Drives Synchronous Rectifier," EDN, Nov. 28, 1985.

Archer, William R., "Current–Driven Synchronous Rectifier," Motorola TMOS Power FET Design Ideas, BR316, pp. 9–10, 1985.

Blanchard, Richard, et al., "MOSFETs, Schottky Diodes Vie for Low–Voltage–Supply Designs," EDN, p. 197, Jun. 28, 1984.

Borghi et al., "Discontinuous Conduction Mode Power Switching Regulator IC," PCI Oct. 1988 Proceedings, pp. 31–41, Oct. 1988.

Brown, Marty, "Practical Switching Power Supply Design," pp. 20–34, Academic Press, Inc., 1990.

Business Wire, "Micro Linear announces first single–chip power controller for notebook computers," Apr. 16, 1992.

Gontowski et al., "Advanced New Integrated Circuits For Current–Mode Control," Proceedings of the Power Electronics Show and Conference, pp. 341–352, Oct. 1988.

Goodenough, Frank, "Synchronous Rectifier UPS PC Battery Life," Electronic Design, pp. 47–53, Apr. 16, 1992.

Goodenough, Frank, "Low–Voltage Analog ICs Wait in the Wings," Electronic Design, Sep. 3, 1992.

Gracie, Paul D., "Intermittent Converter Saves Power," EDN, p. 151, Sep. 1, 1989.

Grant, Duncan A. et al., "Power MOSFETS, Theory and Application," pp. 239–256, Wiley–Interscience, 1989.

Horowitz & Hill, "The Art of Electronics," pp. 356–359, Cambridge University Press, 1989.

Patel, Raoji, "Using Bipolar Synchronous Rectifiers Improves Power Supply Efficiency," Proceedings of the Power Sources Conference, Nov. 1984.

Quinnell, Richard A., "Analog IC Combines Five Functions for Battery Power Management," EDN, Apr. 23, 1992.

Redl et al., "Frequency Stabilization and Synchronization of Free–Running Current–Mode Controlled Converters," PESC '86 Record, pp. 519–530, 1986.

Redl, et al., "Overload–Protection Methods For Switching–Mode DC/DC Converters: Classification, Analysis, and Improvements," PESC '87 Record, pp. 107–118, 1987.

Rippel, W.E., "Synchronous Half–Wave Rectifier," JPL Technical Support Package, Jul. 1989.

Sakai, E. and Harada, K., "Synchronous Rectifier Using a Bipolar Transistor Driven by Current Transformer," Journal of the Society of Electronic Data Communication, vol. J–74–B–1, No. 8, pp. 639–646, Aug. 1991 (in Japanese, with translation).

Sakai, E. and Harada, K., "A New Synchronous Rectifier Using Bipolar Transistor Drive by Current Transformer," Fourteenth International Telecommunications Energy Conference, pp. 424–429, Oct. 1992.

Savant, C.J., Jr., et al., "Electronic Design: Circuits and Systems," pp. 612–613, The Benjamin/Cummings Publishing Co., 1991.

Soclof, Sidney, "Applications of Analog Integrated Circuits," Figure 2.25, pp. 74–75, Prentice–Hall, Inc. 1985.

Sokal et al., "Control Algorithms and Circuit Designs For Optimally Flyback–Charging an Energy–Storage Capacitor," IEEE Fifth Applied Power Electronics Conference, pp. 295–301, 1990.

Taylor, "Flyback Converter," Electronic Engineering, p. 23, Jul., Jul. 1976.

Uchida, Takahito, "Switching Regulator Controller," Japanese Inventor Associated Disclosed Technology Publication No. 92–2362, published Feb. 15, 1992 (in Japanese, with translation).

Wilcox, M., "The LT1158: Low Voltage, N–Channel Bridge Design Made Easy," Linear Technology, Feb. 1992.

Williams, Jim, "Basic Principles and Ingenious Circuits Yield Stout Switchers," EDN, Jan 19, 1990.

Harris Semiconductor, Hodgins et al., "HIP 5060 Family of Current Mode Control ICs Enhance 1 MHZ Regulator Performance," Application Note AN9212.1, pp. 11–191–11–197, 1992.

Harris Semiconductor, "HIP 5060 Power Control IC Single Chip Power Supply", Datasheet, May 1992.

Harris Semiconductor, "HIP 5060 Power Control IC Single Chip Power Supply", Datasheet, Apr. 1994.

International Rectifier, Clemente et al., "HV Floating MOS–ate Driver IC," Application Note AN–978A, 1990.

Linear Technology, "LT1074 Switching Regulator," Preliminary Datasheet, Jun. 1989.

Linear Technology, "LT1072 1.25A High Efficiency Switching Regulator," Datasheet, 1990.

Linear Technology, "LT1524/LT3524 Regulating Pulse Width Modulator," 1990.

Linear Technology, Wilcox, M., "LT1158 Half Bridge N–Channel Power MOSFET Driver," Datasheet, 1992.

Maxim Integrated Products, "MAX635/636/637 Preset/Adjustable Output CMOS Inverting Switching Regulators," Datasheet, Date Unknown.

Maxim Integrated Products, "MAX746 High–Efficiency, PWM, Step–Down, N–Channel DC–DC Controller," Datasheet, Nov. 1993.

Maxim Integrated Products, "MAX747 High–Efficiency PWM, Step–Down P–Channel DC–DC Controller," Datasheet, Sep. 1993.

Maxim Integrated Products, "MAX777L/MAX778L/MAX779L Low–Voltage Input, 3V/3.3V/5V/ Adjustable Output, Step–Up DC–DC Converters," Datasheet, Jul. 1996.

Maxim Integrated Products, "MAX783 Triple–Output Power–Supply Controller for Notebook Computers," Datasheet, May 1994.

Micro Linear, "ML 4822 DC/DC Converter Controller for Portable Computers," Datasheet, Aug. 1991.

Micro Linear, "ML4862 EVAL User's Guide," Jun. 1992.

Micro Linear, "ML4862 Battery Power Control IC," Datasheet, Jul. 1992.

Micro Linear, "ML4862 Battery Power Control IC," Datasheet, Jan. 1997.

Micro Linear, "ML4873 Battery Power Control IC," Datasheet, Jan. 1997 (preliminary version Mar. 1993—cited above).

National Semiconductor Corporation, "LM1578/LM2578/LM3578 Switching Regulator," Preliminary Datasheet, 1987.

Siliconix, "Siliconix Si9110/Si9111," Datasheet, Oct. 1987.

Siliconix, "Si91XX Synchronous Buck Controller," Datasheet, Dec. 20, 1990.

Siliconix, "Si9150 Synchronous Buck Regulator Controller, S–42677, Rev. D," Datasheet, Feb. 14, 1995.

Chetty, P.R., "DC timers control dc–dc converters" Electronics, pp. 121 & 123, Nov. 13, 1975.

Dell Computer Corporation, "Dell Computer Corporation Introduces Advanced Notebook PC," (alleged to contain UC1895 (see Unitrode Advance Information Datasheet, Oct. 5, 1992), Sep. 1991.

Dinsmore, D., "Dual regulator handles two input voltages," EDN, Jan. 21, 1993.

Fisher, R. A. et al., "Performance of Low Loss Synchronous Rectifiers in a Series–Parallel Resonand DC–DC Converter," Proceedings of the Fourth Annual IEEE Applied Power Electronics Conference and Exposition, pp. 240–246, Mar. 1989.

Gauen, Kim, "Synchronous Rectifier Improves Step–Down Converter Efficiency," PCIM, pp. 8, 11–12 & 14–15, Apr. 1993.

Goodenough, F., "Dozing IC Op Amps Wake Up For Input Signal," Electronic Design, Dec. 5, 1991.

Goodenough, F., "Raise Switcher Efficiency Above 90%", Electronic Design, Jan. 21, 1993.

Hewett, S., "Improved Switched Mode Power Supply Regulation by Eliminating Turn–off Spikes," IBM Technical Disclosure Bulletin, vol. 31 No. 4, pp. 97–98, Sep. 1988.

Ikeda, S. et al., "Power MOSFET for Switching Regulator," International Telecommunications Energy Conference, Oct. 1982.

Kassakian, J. et al., "Principles of Power Electronics," pp. 103–165, Addison–Wesley Publishing Company, 1991.

Kerridge, Brian, "Battery power breeds efficient regulators," EDN, pp. 103–108, Mar. 18, 1993.

Lee, Y. S. and Cheng, Y. C., "A 580kHz switching regulator using on–off control," Journal of the Institution of Electronic and Radio Engineers, vol. 57, No. 5, pp. 221–226, Sep. 1987.

Markus, John, "Guidebook of Electronic Circuits," pp. 647 & 649, 1971.

Meakin, Mike, "The LM3578 Switching Power Regulator," Electronic Engineering, pp. 47–52, Jul. 1986.

Myers, R. and Peck, R., "200–kHz Power FET Technology in New Modular Power Supplies," Hewlett–Packard Journal, Aug. 1981.

NASA Jet Propulsion Laboratory, "Synchronous Half–Wave Rectifier," Jul. 1989.

Patel, R., "Bipolar synchronous rectifiers cut supply losses," EDN, Apr. 4, 1985.

Shepard, J., "Powering portable systems," EDN, Nov. 5, 1992.

Steigerwald, R., "High–Frequency Resonant Transistor DC–DC Converters," IEEE Transactions on Industrial Electronics, vol. IE–31, No. 2, pp. 181–191, May 1984.
Williams, J., "Employ pulse–width modulators in a wide range of controllers," EDN, Sep. 2, 1981.
Williams, J., "Design dc–dc converters to catch noise at the source," Electronic Design, Oct. 15, 1981.
Williams, J., "Conversion techniques adapt voltages to your needs," EDN, Nov. 10, 1982.
Williams, J., "Special circuit–design techniques enhance regulator performance," EDN, Sep. 1, 1983.
Williams, J., "Use low–power design methods to condition battery outputs," EDN, Oct. 18, 1984.
Williams, J., "Chopper amplifier improves operation of diverse circuits," EDN, Mar. 7, 1985.
Williams, J., "Design linear circuits for 5V operation," EDN, May 2, 1985.
Williams, J., "Design techniques extend V/F–converter performance," EDN, May 16, 1985.
Williams, J., "Refine V/F–converter operation with novel design techniques," EDN, May 30, 1985.
Williams, J., "Analog circuits operate from a 1.5V cell," EDN, Sep. 19, 1985.
Williams, J., "Considerations for Five Volt Linear Circuits," Professional Program Session Record 20, Circuits for Analog Signal Processing and Data Conversion is Single +5V Supply Systems, Wescon/85, Nov. 1985.
Williams, J., "Switching regulator takes on more power," Electronic Product Design, Jan. 1986.
Williams, J., "Micropower circuits assist low–current signal conditioning," EDN, Aug. 6, 1987.
Williams, J., "Signal conditioning circuits use µpower design techniques," EDN, Aug. 20, 1987.
Williams, J., "Regulator IC speeds design of switching power supplies," EDN, Nov. 12, 1987.
Williams, J., "Galvanically isolated switching supplies provide high power," EDN, Nov. 26, 1987.
Williams, J., "Clever techniques improve thermocouple measurements," EDN, May 26, 1988.
Williams, J., "Design linear circuits that serve digital system needs," EDN, Apr. 27, 1989.
Williams, J., "Astute designs improve efficiencies of linear regulators," EDN, Aug. 17, 1989.
Williams, J., "Correcting power–supply problems," EDN, Dec. 10, 1991.
Williams, J., "1.5 to 5V converter supplies 200mA," EDN, Oct. 15, 1992.
Williams, J., "Designing supplies for powering LCD backlighting," EDN, Oct. 29, 1992.
Williams, J., "Bridge forms synchronous rectifier," EDN, Date Unknown
Williams, J. and Dendinger, S., "Simplify feedback controllers with a 2–quandrant PWM IC," EDN, May 26, 1983.
Williams, J. and Huffman, B., "Precise converter designs enhance system performance," EDN, Oct. 13, 1988.
Williams, J. and Huffman, B., "Proper instrumentation eases low–power dc/dc–converter design," EDN, Oct. 27, 1988.
Williams, J. and Huffman, B., "Design dc/dc converters for power conservation and efficiency," EDN, Nov. 10, 1988.
Williams, J. and Huffman, B., "Switched–capacitor networks simplify dc/dc–converter designs," EDN, Nov. 24, 1988.
Williams, J. and Waller, B., "Performance–Enhancement Techniques for Three–Terminal Regulators," New Electronics, Oct. 4, 1983.
International Rectifier, "IR Application Note AN–978, HV Floating MOS–Gate Driver ICs, A Typical Block Diagram," Application Note from web page, Date Unknown.
International Rectifier, "IR Application Note AN–978, HV Floating MOS–Gate Driver ICs, Full Bridge With Current Mode Control," Application Note from web page, Date Unknown.
Linear Technology, Pietkiewicz et al., "DC–DC Converters for Portable Computers," Design Note 52, 1991.
Linear Technology, "LT1170/LT1171/LT1172 100kHz, 5A, 2.5A and 1.25A High Efficiency Switching Regulators," Data Sheet, 1991.
Linear Technology, "LT1271/LT1269 4A High Efficiency Switching Regulators," Data Sheet, 1992.
Linear Technology, Nelson, C., App. Note 19, "LT–1070 Design Manual," Jun. 1986.
Linear Technology, Williams, J., App. Note 25, "Switching Regulators for Poets," Sep. 1987.
Siliconix, "High–Efficiency Buck Converter for Notebook Computers," Application Note AN92–4, Date Unknown.
Siliconix, "Designing DC/DC Converters with the Si9110 Switchmode Controller," Siliconix Power Products Data Book, 1991.
Siliconix, "Si9150CY/BCY Synchronous Buck Converter Controller," Preliminary Data Sheet, Oct. 8, 1992.
Siliconix, "Synchronous Rectification," Design Ideas, Oct. 1980.
Unitrode, "Using Bipolar Synchronous Rectifiers Improves Power Supply Efficiency," Application Note, Jun. 1985.

CONTROL CIRCUIT AND METHOD FOR MAINTAINING HIGH EFFICIENCY OVER BROAD CURRENT RANGES IN A SWITCHING REGULATOR CIRCUIT

This is a division of application Ser. No. 08/799,467, filed Feb. 13, 1997 entitled CONTROL CIRCUIT FOR MAINTAINING HIGH EFFICIENCY OVER BROAD CURRENT RANGES IN A SWITCHING REGULATOR CIRCUIT, now U.S. Pat. No. 5,731,694, which is a continuation of application Ser. No. 08/634,688, filed Apr. 18, 1996, now abandoned, which is a continuation of application Ser. No. 08/476,232, filed Jun. 7, 1995, now abandoned, which is a divisional of application Ser. No. 08/036,047, filed Mar. 23, 1993, now U.S. Pat. No. 5,481,178.

BACKGROUND OF THE INVENTION

The present invention relates to a switching regulator circuit. More particularly, the present invention relates to a control circuit and method for maintaining high efficiency over broad current ranges in a switching regulator circuit.

The purpose of a voltage regulator is to provide a predetermined and constant output voltage to a load from a poorly-specified and fluctuating input voltage source. Generally, there are two different types of regulators: series regulators and switching regulators.

The series regulator employs a pass element (e.g., a power transistor) coupled in series with a load and controls the voltage drop across the pass element in order to regulate the voltage which appears at the load. In contrast, the switching regulator employs a switch (e.g., a power transistor) coupled either in series or parallel with the load. The regulator controls the turning ON and turning OFF of the switch in order to regulate the flow of power to the load. The switching regulator employs inductive energy storage elements to convert the switched current pulses into a steady load current. Thus, power in a switching regulator is transmitted across the switch in discrete current pulses, whereas in a series regulator, power is transmitted across the pass element as a steady current flow.

In order to generate a stream of current pulses, switching regulators typically include control circuitry to turn the switch on and off. The switch duty cycle, which controls the flow of power to the load, can be varied by a variety of methods. For example, the duty cycle can be varied by either (1) fixing the pulse stream frequency and varying the ON or OFF time of each pulse, or (2) fixing the ON or OFF time of each pulse and varying the pulse stream frequency.

Which ever method is used to control the duty cycle, switching regulators are generally more efficient than series regulators. In series regulators, the pass element is generally operated in its linear region where the pass element conducts current continuously. This results in the continuous dissipation of power in the pass transistor. In contrast, in switching regulators, the switch is either OFF, where no power is dissipated by the switch, or ON in a low impedance state, where a small amount of power is dissipated by the switch. This difference in operation generally results in reduced amounts of average power dissipation in switching regulators.

The above difference in efficiency can be more apparent when there is a high input-output voltage difference across the regulator. For example, it would not be unusual for a series regulator to have an efficiency of less than 25 percent when a switching regulator could perform an equivalent function with an efficiency of greater than 75 percent.

Because of their improved efficiency over series regulators, switching regulators are typically employed in battery-operated systems such as portable and laptop computers and hand-held instruments. In such systems, when the switching regulator is supplying close to the rated output current (e.g., when a disk or hard drive is ON in a portable or laptop computer), the efficiency of the overall circuit can be high. However, the efficiency is generally a function of output current and typically decreases at low output current. This reduction in efficiency is generally attributable to the losses associated with operating the switching regulator. These losses include, among others, quiescent current losses in the control circuitry of the regulator, switch losses, switch driver current losses and inductor/transformer winding and core losses.

The reduction in efficiency of a switching regulator at low output current can become important in battery-operated systems where maximizing battery lifetime is desirable.

In view of the foregoing, it would be desirable to provide a high efficiency switching regulator.

It would also be desireable to provide a control circuit and method for maintaining high efficiency over broad current ranges, including low output currents, in a switching regulator circuit.

SUMMARY OF THE INVENTION

It is therefore an object of the present invention to provide a high efficiency switching regulator.

It is also an object of the present invention to provide a control circuit and method for maintaining high efficiency over broad current ranges, including low output currents, in a switching regulator circuit.

In accordance with these and other objects of the invention, there is provided a circuit and method for controlling a switching voltage regulator having (1) a switch including one or more switching transistors and (2) an output adapted to supply current at a regulated voltage to a load including an output capacitor. The circuit and method generates a control signal to turn the one or more switching transistors OFF under operating conditions when the voltage at the output is capable of being maintained substantially at the regulated voltage by the charge on the output capacitor (e.g., during low output currents). During such periods of time, the load does not consume power from the input power source. Therefore, the regulator efficiency is increased. If desired, other components in the switching regulator, in addition switching transistors, can also be intentionally held OFF to conserve additional power. This additional feature of the present invention can further increase the efficiency of the overall regulator circuit.

The circuit and method of the present invention can be used to control various types of switches in switching regulator circuits, including switches that use either one or more power transistors. Additionally, the circuit and method can be used to control switches in various types of switching regulator configurations, including voltage step-down, voltage step-up and polarity-inversing configurations.

Additionally, the circuit and method of the present invention can vary the OFF time of the switching transistor in response to the input and output voltages of the switching regulator. This feature of the present invention reduces the emission of audible noise from the switching regulator during low input voltage conditions. It also reduces the potential for current runaway during short circuits in the output voltage for some regulator configurations.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
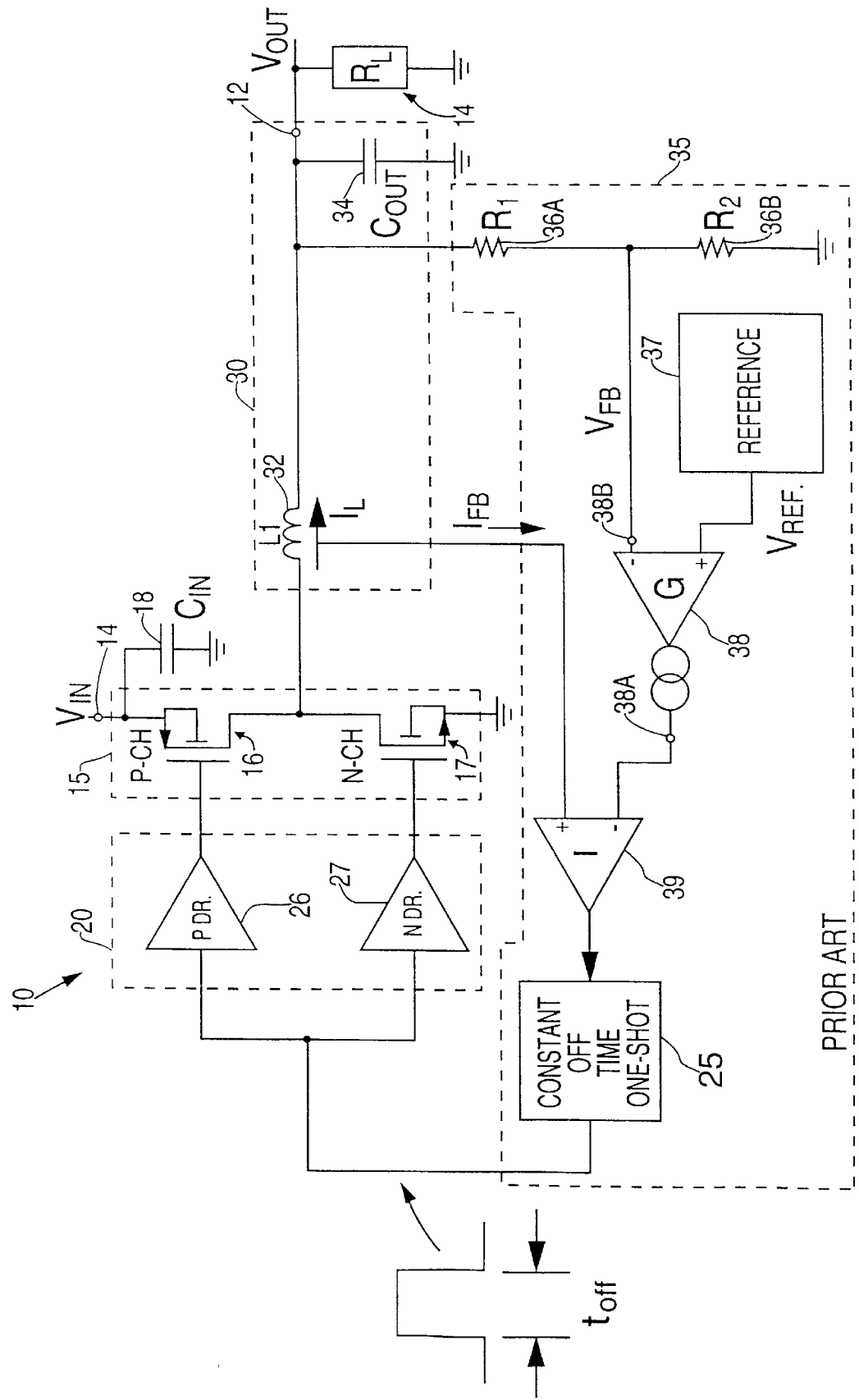
FIG. 1 is a schematic block diagram of a typical prior art switching regulator circuit employing a switch including a pair of synchronously-switched MOSFETs in a step-down configuration.

FIG. 1 is a schematic block diagram of a typical prior art switching regulator circuit employing a push-pull switch in a step-down configuration.

Referring to FIG. 1, circuit 10 is used to provide a regulated DC output voltage $V_{OUT}$ at terminal 12 (e.g., 5 volts) for driving load 14 which, for example, may be a portable or laptop computer or other battery-operated system. Circuit 10 operates from an unregulated supply voltage $V_{IN}$ coupled to terminal 14 (e.g., a 12 volt battery). Circuit 10 includes push-pull switch 15, driver circuit 20, output circuit 30 and control circuit 35.

Driver circuit 20 is used to drive push-pull switch 15 which includes two synchronously-switched power MOSFETS 16 (p-channel) and 17 (n-channel) stacked in series between supply rail $V_{IN}$ and ground. Push-pull switch 15 in conjunction with driver circuit 20 is typically referred to as a "half-bridge" configuration. MOSFETS 16 and 17 are used to alternately supply current to output circuit 30 which includes inductor 32 (L1) and output capacitor 34 ($C_{OUT}$). Output circuit 30 smooths the alternating supply of current so that load 12 is provided a regulated voltage $V_{OUT}$. In order to supply the alternating current, MOSFETS 16 and 17 are respectively driven by P-channel driver 26 and N-channel driver 27, which in turn are both controlled by control circuit 35.

Control circuit 35 includes one-shot circuit which provides an OFF pulse of constant duration (e.g., 2 to 10 microseconds) during which time MOSFET 16 is held OFF and MOSFET 17 is held ON by drivers 26 and 27, respectively. Otherwise, one-shot circuit 25 provides an ON pulse during which time MOSFET 16 is held ON and MOSFET 17 is held OFF. Therefore, one-shot circuit 25 alternately turns MOSFETS 16 and 17 ON and OFF to provide an alternating supply of current to (output circuit 30. The duty cycle of the one-shot circuit 35 is in turn controlled by current amplifier 39.

Control circuit 35 monitors the output voltage $V_{OUT}$ through resistor-divider network $R_1/R_2$ (36A/36B) to provide a feedback voltage $V_{FB}$ proportional to the output voltage $V_{OUT}$. Control circuit 35 also monitors the current $I_L$ through inductor L1 to provide a feedback current $I_{FB}$ proportional to inductor current $I_L$. Circuit 10 operates by controlling inductor current $I_L$ so that the feedback voltage $V_{FB}$ is regulated to be substantially equal to a reference voltage $V_{REF}$ provided by reference circuit 37. With feedback voltage $V_{FB}$ being regulated, the output voltage $V_{OUT}$ is in turn regulated to a higher voltage by the ratio of $(R_1+R_2)$ to $R_2$.

Transconductance amplifier 38 is used to compare the feedback voltage $V_{FB}$ to a reference voltage $V_{REF}$. Circuit 10 regulates the output voltage $V_{OUT}$ as follows. During each cycle when switch 15 is "ON", P-MOSFET 16 is turned ON and the current $I_L$ in inductor L1 ramps up at a rate dependent on $V_{IN}-V_{OUT}$. When $I_L$ ramps up to a threshold level set by output 38A of transconductance amplifier 38, current comparator 39 trips and triggers the one-shot OFF pulse, initiating the "OFF" cycle of switch 15. During the "OFF" cycle, one-shot circuit 25 holds P-MOSFET 16 OFF and turns N-MOSFET 17 ON. This in turn causes the current $I_L$ in inductor L1 to ramp down at a rate dependent on $V_{OUT}$. Thus, the duty cycle of the periodic turning OFF of switch 15 is controlled so the current $I_L$ produces a regulated output voltage $V_{OUT}$ at terminal 12.

As the output load current increases, the voltage drop across $R_2$ resistor 36B will decrease. This translates into a small error voltage at input 38B of transconductance amplifier 38 that will cause output 38A to increase, thus setting a higher threshold for current comparator 39. Consequently, current $I_L$ in inductor L1 is increased to the level required to support the load current.

Since the OFF time ($t_{OFF}$) of one-shot circuit 25 is constant, switching regulator circuit 10 has a constant ripple current in inductor L1 (for constant output voltage $V_{OUT}$), but has a frequency which varies with $V_{IN}$. The ripple oscillation frequency is given by the equation:

$$f_{RIP}=(1/t_{OFF})[1-(V_{OUT}/V_{IN})]$$

One disadvantage of circuit 10 in FIG. 1 is that the ripple oscillation frequency $f_{RIP}$ may decrease to an audible level with low input voltages $V_{IN}$. This could occur, for example, when a battery powering the switching regulator circuit is nearly discharged. Inductor L1 may then generate and emit noise that can be objectionable to a user of the device employing the regulator circuit.

An additional disadvantage of prior art circuit 10 is that the inductor current $I_L$ is not well controlled when the output voltage $V_{OUT}$ is shorted to ground. The basic relationship between inductor current and voltage is given by the equation di/dt=V/L. This means that the rate at which current $I_L$ in inductor L1 decays during the OFF-time depends on the voltage across inductor L1, which is the sum of $V_{OUT}$ and the drain to source voltage, $V_{DS}$, of N-MOSFET 17. During a short, $V_{OUT}$ approaches zero while $V_{DS}$ is also very low, resulting in very little decay of current $I_L$ in inductor L1 during $t_{OFF}$. However, following each OFF cycle, P-MOSFET 16 is turned back ON until current comparator 39 again trips one-shot constant OFF time control circuit 25. Even for the minimum time that P-MOSFET 16 is ON, the current $I_L$ in inductor L1 may increase by more than it can decrease during $t_{OFF}$. This may result in a runaway condition in which the short circuit current may reach destructive levels.

A further disadvantage of prior art circuit 10 results from the constant ripple current in inductor L1. During $t_{OFF}$, current $I_L$ in inductor L1 always ramps down by the same amount regardless of the output current of the regulator. At low output currents this can cause the current in inductor L1 to reverse polarity and, thus, pull power from the load. During the following ON cycle, this current again ramps positive such that the average inductor current equals the load current Losses associated with this constant ripple current, along with switching losses due to the charging and discharging of switch 15's MOSFET gates, can produce large reductions in efficiency at low output currents. This will be especially the case if the current in inductor L1 reverses and power is pulled from the load to ground through N-MOSFET 17.

A still further disadvantage of prior art circuit 10 concerns the gate drives to P-MOSFET 16 and N-MOSFET 17. Delays are generally incorporated into drivers 26 and 27 to ensure that one power MOSFET turns OFF before the other turns ON. If there is insufficient deadtime between the conduction of the two MOSFETs (due to, for example, device, circuit processing, or temperature variations), current will be passed directly from input supply $V_{IN}$ to ground. This "shoot-through" effect can dramatically reduce efficiency, and in some circumstances, can overheat and destroy the power MOSFETs.

Figure 2:
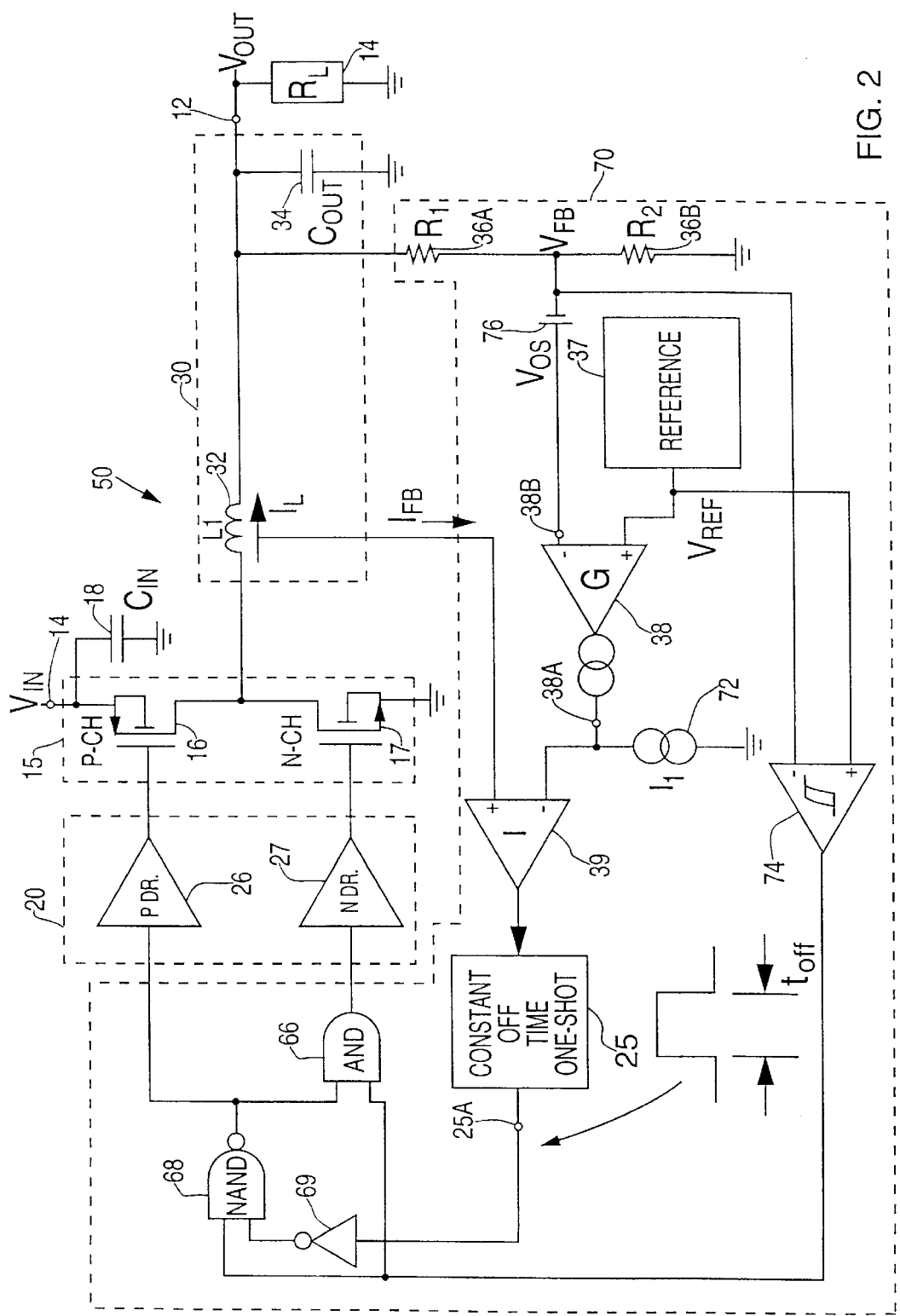
FIG. 2 is a schematic block diagram of a switching regulator circuit incorporating a first embodiment of the high-efficiency control circuit of the present invention to drive a switch including a pair of synchronously-switched MOSFETs in a step-down configuration.

FIG. 2 is a schematic block diagram of a switching regulator circuit incorporating a first embodiment of the high-efficiency control circuit of the present invention for driving a switch including a pair of synchronously-switched MOSFETs in a step-down configuration.

Switching regulator circuit 50 includes push-pull switch 15, driver circuit 20 and output circuit 30 similar to those of FIG. 1. Circuit 50 also includes an embodiment 70 of the high-efficiency control circuit of the present invention.

Control circuit 70 includes one-shot circuit 25, current comparator 39 and amplifier 38 similar to those of FIG. 1. However, in addition to those components, control circuit 70 also includes constant current source $I_1$ 72 and hysteretic comparator 74 for providing high efficiency operation at low average current levels.

As will be discussed in greater detail below, constant current source $I_1$ 72 and comparator 74 allow push-pull switch 15 to go into a state of operation where both MOSFETS 16 and 17 are simultaneously OFF under conditions where the output voltage $V_{OUT}$ can be maintained substantially at the regulated voltage $V_{REG}$ by output capacitor $C_{OUT}$. This state of operation is referred to herein as a "sleep mode." The ability of push-pull switch 15 to go into such a sleep mode is in contrast to the regulator circuit of FIG. 1 where one of the two MOSFETs 16 and 17 is substantially ON at all times. This feature of the present invention reduces the regulator circuit power consumption since push-pull switch 15 does not dissipate power or allow power to be pulled from load $R_L$ to ground in sleep mode.

Furthermore, if desired, while push-pull switch 15 is in the above-described sleep mode, the regulator circuit can turn OFF other circuit components which are not needed while the regulator is in sleep mode. For example, for the embodiment of the present invention shown in FIG. 2, one-shot circuit 25, current comparator 39, current source $I_1$ 72 and amplifier 38 can also be turned OFF in sleep mode. This feature of the present invention allows the regulator circuit to operate at even higher efficiencies than otherwise possible if only push-pull switch 15 were maintained in a sleep mode.

At high load current levels (e.g., greater than 20 percent of the maximum rated output current) control circuit 70 operates similar to control circuit 35 of FIG. 1. In FIG. 2, the current feedback $I_{FB}$ is again provided to the non-inverting input of current comparator 39. Offset $V_{OS}$ 76, which preferably is built into amplifier 38, level-shifts feedback voltage $V_{FB}$ slightly below reference voltage $V_{REF}$, thus keeping the output of hysteretic comparator 74 high during high current conditions. When the feedback current $I_{FB}$ exceeds the current supplied to the inverting input of current comparator 39, the output of comparator 39 goes HIGH so as to initiate the switch "OFF" cycle.

During the "OFF" cycle, output 25A of one-shot circuit 25 is HIGH, which turns P-MOSFET 16 OFF and N-MOSFET 17 ON. After a constant time set by one-shot circuit 25, output 25A goes LOW, thus initiating the next "ON" cycle where P-MOSFET 16 ON and N-MOSFET 17 OFF.

In accordance with the present invention, regulator circuit 50 goes into sleep mode at low output current levels as follows. Hysteretic comparator 74 monitors the feedback voltage $V_{FB}$ and goes LOW when $V_{FB}$ exceeds a predetermined voltage value in excess of the reference voltage $V_{REF}$. Such a condition is indicative of the output voltage $V_{OUT}$ exceeding a predetermined voltage value in excess of the regulated voltage $V_{REG}$. This over voltage condition is intentionally induced at low average output currents by providing a constant current source $I_1$ 72 coupled in parallel with amplifier 38. During the over voltage condition both MOSFETS 16 and 17 are maintained OFF by way of AND gate 66 and NAND gate 68.

Constant current source $I_1$ sets a minimum feedback current threshold for current comparator 39. This sets a minimum current required in inductor L1 during each ON cycle to trip comparator 39. In accordance with the present invention, current comparator 39 is intentionally forced to remain ON at current levels that would otherwise cause it to trip. Thus, more current is supplied to inductor L1 than is necessary to maintain the output voltage $V_{OUT}$ at the regulated voltage $V_{REG}$. As a result, $V_{OUT}$ will begin to increase beyond the regulated voltage $V_{REG}$, causing the feedback voltage $V_{FB}$ to trip hysteretic comparator 74 at a predetermined voltage value in excess of $V_{REF}$. When comparator 74 trips, its output goes LOW to turn both MOSFET 16 and 17 OFF to put the regulator circuit into sleep mode.

In the above-described state of operation (i.e., "sleep model") where MOSFETs 16 and 17 are both simultaneously OFF, the output load 14 is supported substantially by output capacitor $C_{OUT}$. Hysteretic comparator 74 monitors the feedback voltage $V_{FB}$ and when $V_{OUT}$ falls such that $V_{FB}$ has decreased by the amount of the hysteresis in comparator 74, driver circuit 20 is taken out of sleep mode (where MOSFETS 16 and 17 are both driven OFF) so that a new ON cycle is initiated to supply current to load 14. If the load current remains low, $C_{OUT}$ will recharge to a voltage level in excess of $V_{REG}$ and the feedback voltage $V_{FB}$ will again trip comparator 74 after only a few cycles.

Thus, during light loads, control circuit 70 is adapted to turn both MOSFET 16 and MOSFET 17 OFF when they are not needed to maintain the output voltage substantially at the regulated voltage level if the output capacitor $C_{OUT}$ is capable of doing so. When the output voltage falls below the regulated voltage level in such a mode, control circuit 70 is adapted to briefly turn switch 15 ON to recharge the output capacitor $C_{OUT}$ back to a voltage level in excess of the regulated voltage. Therefore, $V_{OUT}$ will oscillate between upper and lower thresholds separated by the comparator 74 hysteresis voltage multiplied by the ratio of $(R_1+R_2)$ to $R_2$. The rate at which the regulator "wakes up" to recharge output capacitor $C_{OUT}$ will automatically adapt to the load current, maintaining high efficiencies even at low output currents.

In accordance with the present invention, control circuit 70 maintains MOSFETS 16 and 17 OFF over periods of time when the output current is low enough to allow the output capacitor $C_{OUT}$ to maintain the output voltage substantially at the regulated voltage. Typically, such periods of OFF time, wherein both MOSFETS 16 and 17 are maintained OFF even though the switching regulator is providing a regulated voltage, can extend from less than 100 microseconds to over a few seconds (respectively corresponding to a few switch cycles to over one-hundred-thousand switch cycles for a switching frequency of 100 kiloHertz). Such OFF times typically allow high efficiency to be obtained (e.g., over 90%) over an output current range in excess of 100:1. Because other components in addition the switching transistors can also be maintained OFF during such periods, even higher efficiencies can typically be obtained.

Figure 3:
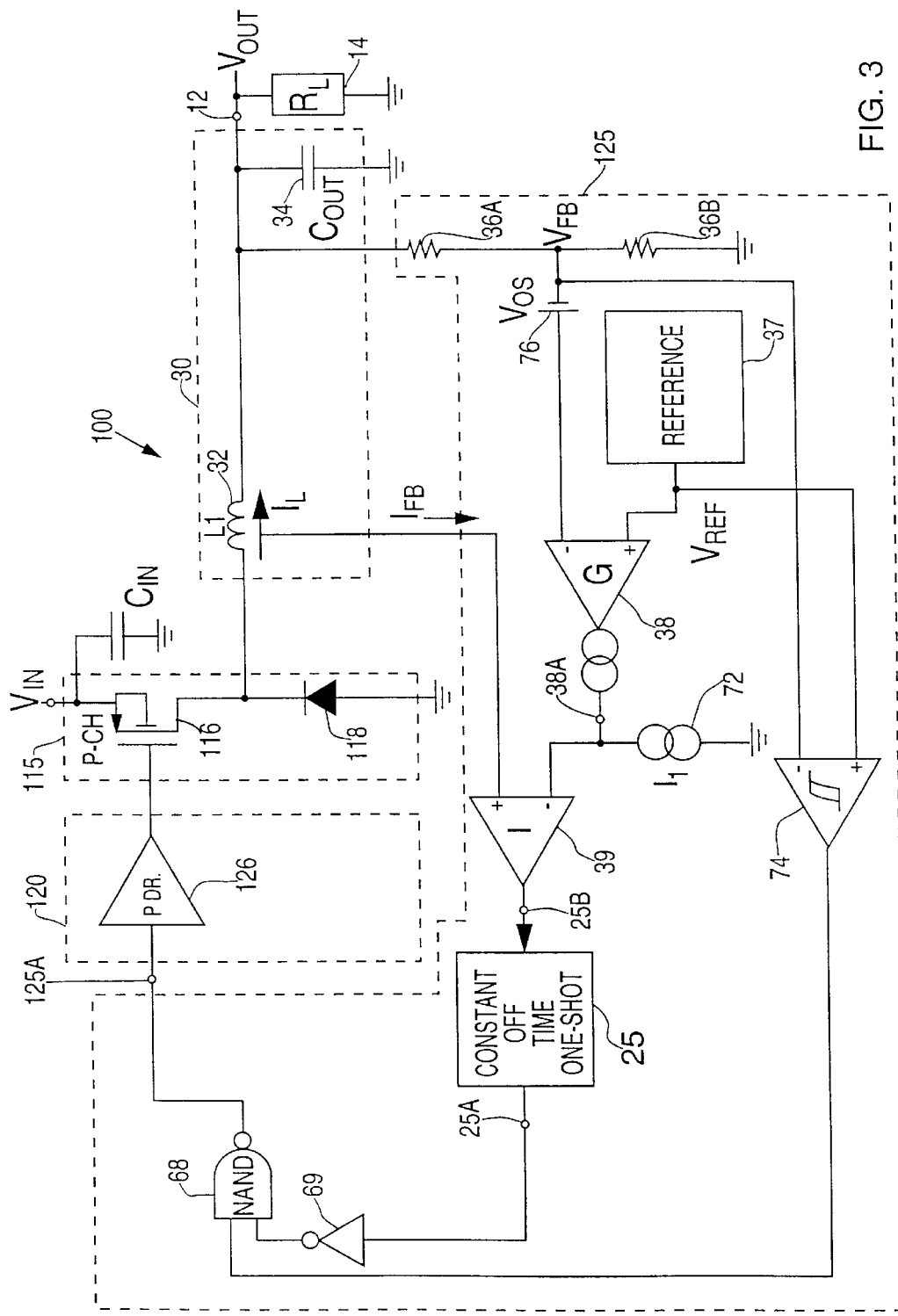
FIG. 3 is a schematic block diagram of a switching regulator circuit incorporating a second embodiment of the high-efficiency control circuit of the present invention to drive a switch including a switching MOSFET and a switching diode in a step-down configuration.

Control circuit 70 of switching regulator 50 shown in FIG. 2 is used to drive a synchronously-switched switch including MOSFETs 16 and 17. As used herein, the term "synchronously-switched switch" refers to a switch including two switching transistors that are driven out of phase to supply current at a regulated voltage to a load. FIG. 3 shows a second embodiment of the high-efficiency control circuit of the present invention adapted to drive a switch including a switching transistor and a switching diode in a step-down configuration.

As shown in FIG. 3, switching regulator circuit 100 includes switch 115 including P-MOSFET 116 and diode 118. Switch 115 is driven by driver 120 including P-driver 126. The turning-ON and turning-OFF of switch 115 is controlled by control circuit 125. Because control circuit 125 is used to only drive one MOSFET (in contrast to control circuit 70 of FIG. 2), it only has one output terminal 125A (taken from the output of NAND gate 68).

Control circuit 125 includes current comparator 39, amplifier 38, hysteretic comparator 74 and one-shot circuit 25, similar to those shown in control circuit 70 of FIG. 2. As discussed above with respect to FIG. 2, at low average output current levels, constant current source $I_1$ 72 is used to intentionally overdrive the current supplied to inductor L1 so as to cause the output voltage $V_{OUT}$ to increase beyond the regulated voltage level $V_{REG}$ where the output can be supported substantially by output capacitor $C_{OUT}$ for extended periods of time. During these extended time periods, P-MOSFET 116 is maintained OFF in a sleep mode so as to increase circuit efficiency.

As discussed above, control circuits 70 and 125 of FIGS. 2 and 3, respectively, provide high-efficiency operation at low average output current levels. Such operation adapts automatically to the output current level. For example, at high output current levels during a first state of operation the switch continually alternates between an ON state and an OFF state to maintain the output voltage $V_{OUT}$ at the regulated voltage level $V_{REG}$. At low output current levels during a second state of operation, where circuit efficiency would otherwise be low, the output voltage $V_{OUT}$ is able to be maintained substantially at the regulated voltage level $V_{REG}$ by output capacitor $C_{OUT}$ without continuously turning the switch ON and OFF. Thus, the control circuit automatically identifies such a condition and allows the regulator circuit to go into a "sleep" mode where a minimal number of circuit components are required to be ON.

Figure 4:
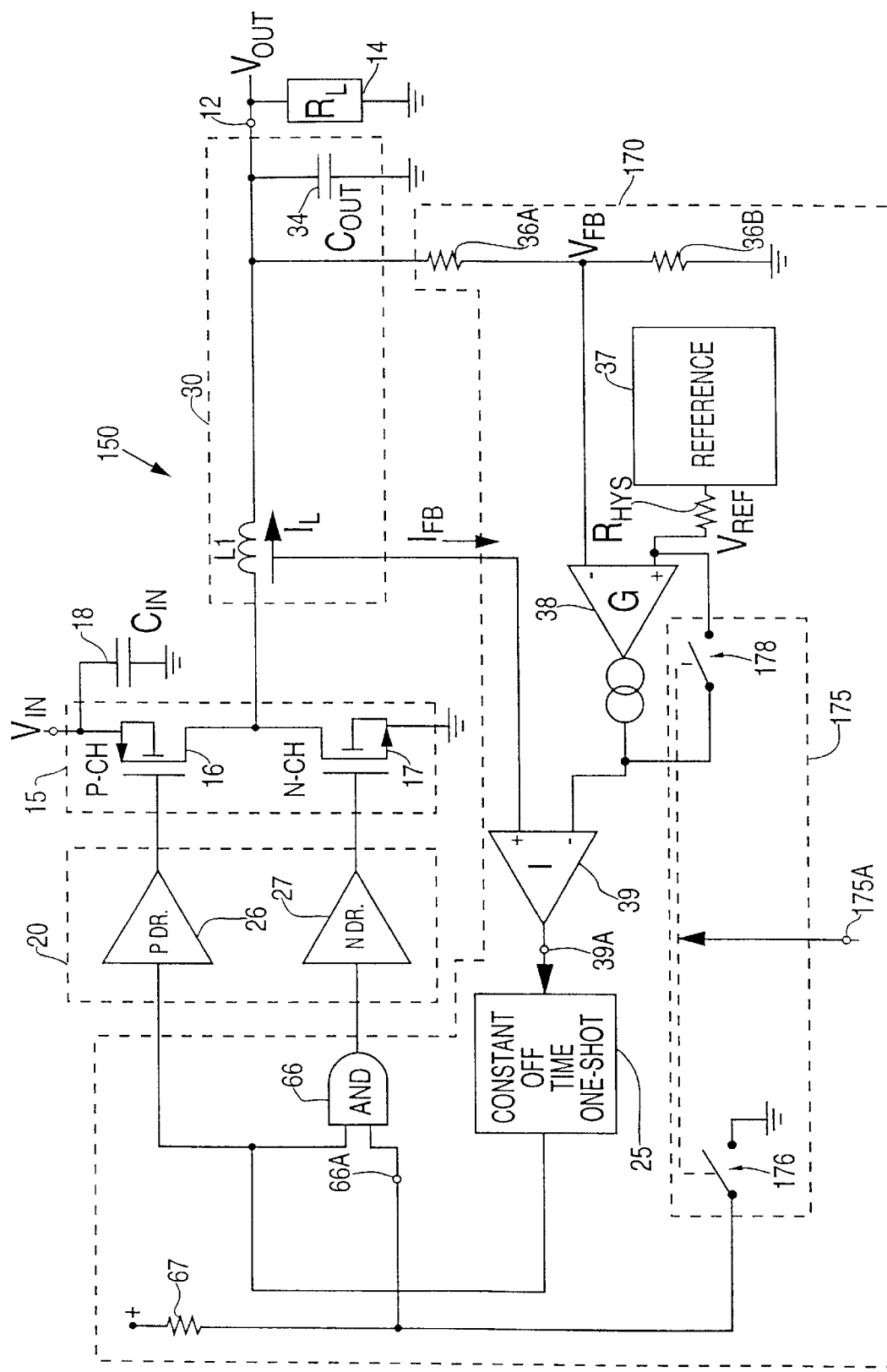
FIG. 4 is a schematic block diagram of a switching regulator circuit incorporating a "user-activated" embodiment of the high-efficiency control circuit of the present invention to drive a switch including a pair of synchronously-switched MOSFETs in a step-down configuration.

In accordance with another feature of the present invention, a regulator circuit can also incorporate a "user activated" embodiment of the control circuit of the present invention where a user input controls whether the regulator circuit is in a "sleep" mode or not. FIG. 4 is a schematic block diagram of a switching regulator circuit incorporating such a "user-activated" embodiment of the high-efficiency control circuit of the present invention for driving a switch including a pair of synchronously-switched MOSFETs in a step-down configuration.

Switching regulator circuit 150 in FIG. 4 includes push-pull switch 15, driver 20, output circuit 30 similar to those in circuit 50 of FIG. 2. Control circuit 170 of regulator circuit 150 includes one-shot circuit 25, current comparator 39 and amplifier 38 also similar to those in circuit 50 of FIG. 2. In contrast to FIG. 2, switch 175 (including switches 176 and 178) is used to manually switch regulator circuit 150 into a sleep mode through user input 175A, which may be a control signal from some other type of control circuit (not shown). Upon the closing of switch 175, switches 176 and 178 both close.

Switch 176 is used to turn N-driver 27 OFF in sleep mode by grounding input 66A of AND gate 66 (which normally is held HIGH by resistor 67 coupled to a positive supply). Switch 178 is used to introduce positive feedback, and therefore hysteresis, into amplifier 38 so as to allow control circuit 170 to maintain the output voltage $V_{OUT}$ substantially at the regulated voltage level $V_{REG}$ in sleep mode. (Resistor $R_{HYS}$, coupled between reference circuit 37 and the non-inverting input of transconductance amplifier 38, is used to assist in feeding back the output of amplifier 38 into the non-inverting input of amplifier 38.)

Switch 178 allows amplifier 38 to overdrive the supply of current to inductor L1 (through P-MOSFET 16) so as to intentionally drive the output voltage $V_{OUT}$ to a predetermined level in excess of the regulated voltage level $V_{REG}$. After being driven to such voltage level, the hysteresis in amplifier 38 maintains P-driver 26 OFF until the feedback voltage $V_{FB}$ falls by at least the hysteresis voltage. At that point, output 39A of current amplifier 39 goes HIGH to trigger one-shot circuit 25 so that P-MOSFET 16 is turned ON to recharge the output capacitor $C_{OUT}$ to the predetermined voltage level in excess of the regulated voltage level $V_{REG}$.

As discussed above, control circuit 170 periodically wakes up during sleep mode to turn P-MOSFET 16 ON to recharge the output capacitor $C_{OUT}$. It will be apparent to those of ordinary skill in art that although N-MOSFET 15 is maintained OFF during such wake-up periods, this does not have to be the case. For example, while control circuit 170 is recharging output capacitor $C_{OUT}$, such recharging could be accomplished by alternately turning the switching transistors OFF so as to vary the duty cycle and thereby recharge the output capacitor $C_{OUT}$.

Thus, regulator circuit 150 operates to increase efficiency at low current levels as in regulator circuit 50 of FIG. 2 if a user manually activates a switch. However, in contrast to regulator circuit 50 of FIG. 2, regulator circuit 150 does not automatically adapt to the output current levels. For example, circuit 150 does not take itself out of sleep mode as the average output current increases—it relies upon user deactivation.

As discussed above, the embodiments of the control circuits of the present invention shown in FIGS. 2–4 include one-shot circuit 25. In accordance with another feature of the present invention, the one-shot circuit could be replaced with other types of circuits that control the duty cycle of the power switch. For example, one-shot circuit 25 could be replaced with a pulse-width modulator circuit that provides a pulse-width modulated signal in response to a control signal. Of course, other types of circuits could be used as well.

In accordance with another feature of the present invention, one-shot circuit 25, which provides a constant OFF-time signal, could be replaced with a one-shot circuit that provides a variable OFF-time control signal dependent upon the output voltage ($V_{OUT}$) and the input voltage ($V_{IN}$). This feature of the present invention can be used to reduce the generation and emission of audible noise from inductor L1 at low input voltages. As discussed above, such noise is associated with oscillation in the inductor current. Furthermore, this feature of the present invention can also be used to control the short circuit current if the output is short circuited.

Figure 5:
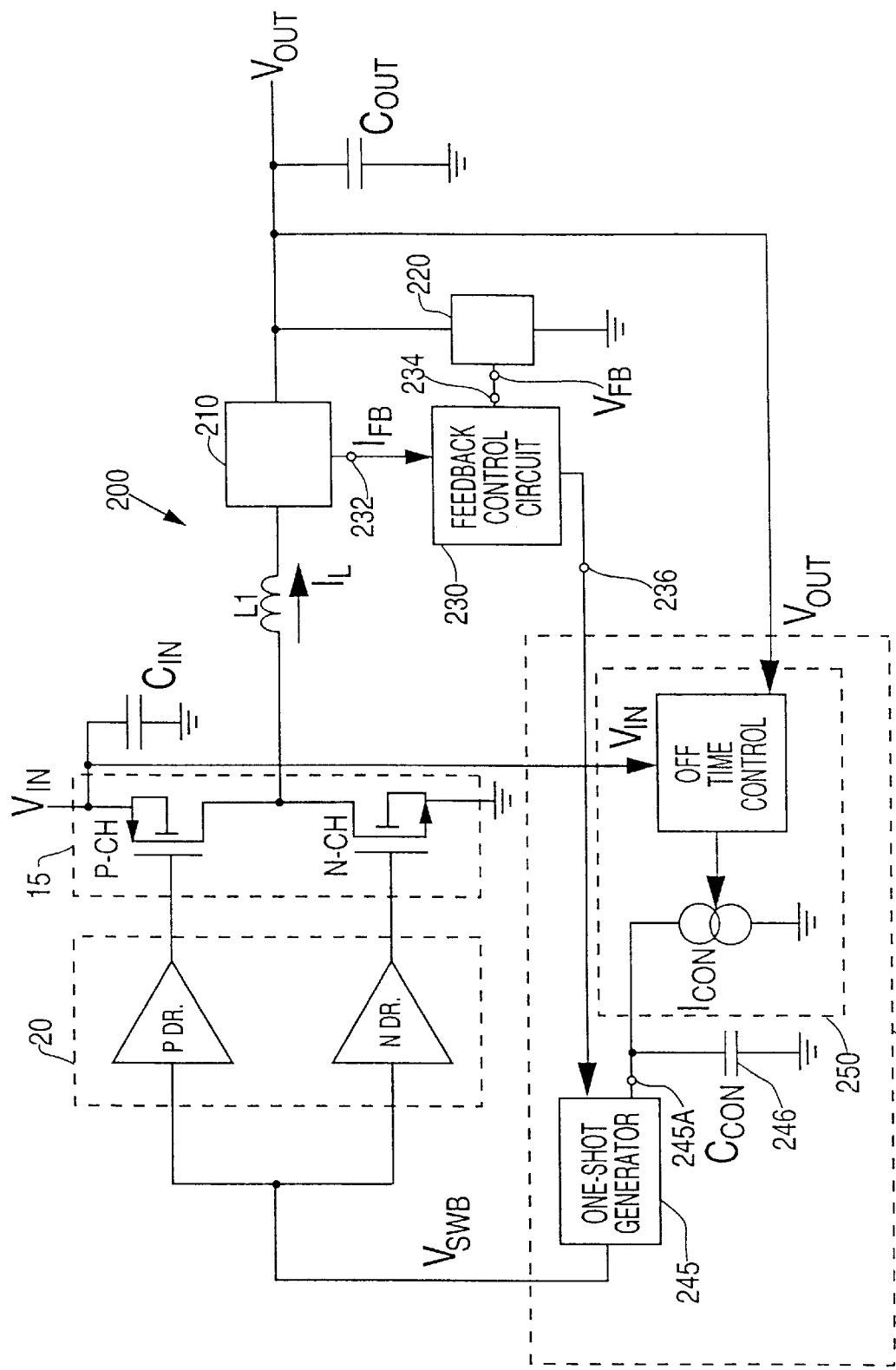
FIG. 5 is a schematic block diagram of a switching regulator circuit incorporating the variable OFF-time control circuit of the present invention.

FIG. 5 is a schematic block diagram of an exemplary switching regulator circuit incorporating the variable OFF-time control circuit of the present invention.

Switching regulator circuit 200 includes push-pull switch 15, driver circuit 20, current feedback circuit 210, voltage feedback circuit 220, feedback control circuit 230 and variable OFF-time circuit 240. Feedback control circuit 230 monitors the output current and output voltage through inputs 232 and 234, respectively, and provides a trigger signal at terminal 236 to initiate the OFF cycle of switch 15. Variable OFF-time circuit 240 is used to control the OFF time as follows.

Circuit 240 includes one-shot generator 245 which is triggered by feedback control circuit 230 through terminal 236. One-shot generator 245 includes an additional terminal 245A coupled to control capacitor ($C_{CON}$) 246 whose voltage is monitored by generator 245. In accordance with the present invention, OFF-time control circuit 250 controls the discharging of capacitor $C_{CON}$, and thus the capacitor voltage, so as to in turn control the OFF time of generator 245. OFF-time control circuit 250 monitors the input and output voltages ($V_{IN}$ and $V_{OUT}$) and, depending upon their values, adjusts the OFF time accordingly.

In accordance with the present invention, if the input voltage $V_{IN}$ decreases so that the inductor L1 oscillation frequency $f_{RIP}$ discussed above falls into an audible range, the OFF time is decreased so that $f_{RIP}$ will accordingly increase out of an audible range. Also, if the output voltage $V_{OUT}$ decreases due to a short circuit so that the voltage across inductor L1 is too low to allow adequate decay in inductor current during the OFF cycle, the OFF time is increased so as to avoid a current runaway condition.

In the present embodiment the discharging of control capacitor $C_{CON}$ is regulated by controlling the magnitude of control current $I_{CON}$. For example, at low input voltages $I_{CON}$ is increased by OFF-time control circuit 250 so that the voltage on control capacitor $C_{CON}$ rapidly falls. When the control capacitor voltage falls below a predetermined value, the ON cycle of switch 15 is initiated. Additionally, at low output voltages $I_{CON}$ is decreased by OFF-time control circuit 250 so that the voltage on control capacitor $C_{CON}$ slowly decays to lengthen the OFF time.

Although switching regulator circuit 200 shown in FIG. 5 relies upon a particular circuit for discharging a capacitor to control the OFF time, it is apparent that other circuits for performing this same function in response to the input and output voltages can also be used. For example, if desired, an operational amplifier could be used to control the OFF-time.

Thus, a one-shot circuit has been discussed which provides a variable OFF-time control signal that adapts to the input and output voltage levels. This feature of the present invention is used to reduce the generation and emission of audible noise from the regulator circuit at low input voltage levels (i.e., reduce $t_{OFF}$ at low input voltages) and to limit the short circuit current if the output is short circuited (i.e., increase $t_{OFF}$ at low output voltages).

Figure 6:
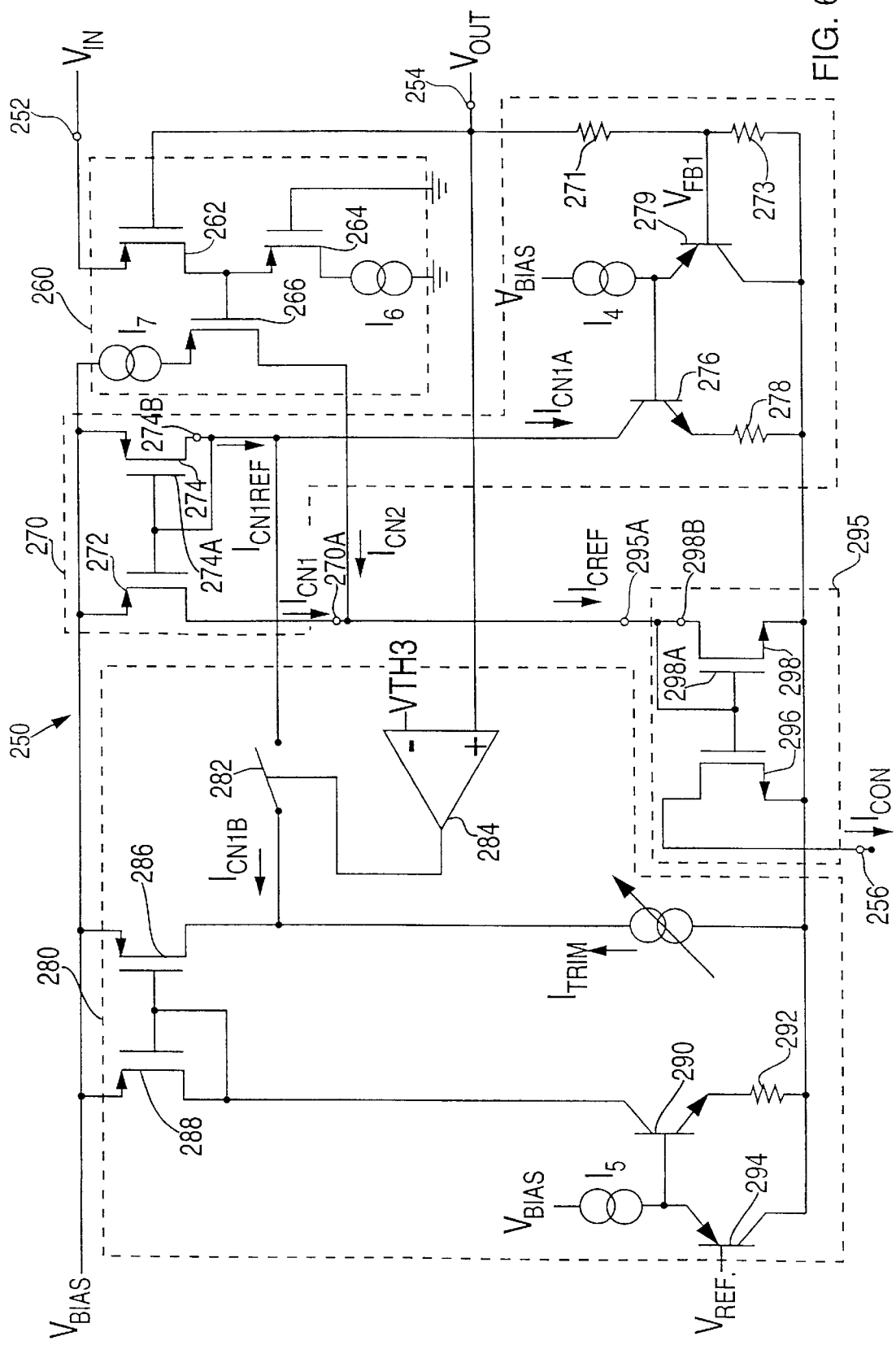
FIG. 6 is a detailed schematic diagram of an embodiment of the variable OFF-time control circuit of FIG. 5.

FIG. 6 is a detailed schematic diagram of an exemplary embodiment of the variable OFF-time control circuit of FIG. 5.

OFF-time control circuit 250 accepts as inputs $V_{IN}$ and $V_{OUT}$ at terminals 252 and 254, respectively, and provides an output $I_{CON}$ at terminal 256. As discussed above, $I_{CON}$ provides for the controlled discharging of a control capacitor $C_{CON}$ coupled to terminal 256. Control circuit 250 controls the magnitude of $I_{CON}$, and therefore controls the time it takes control capacitor $C_{CON}$ to discharge. Control circuit 250 includes current source 260 (for providing current $I_{CN2}$), current source 270 (for providing current $I_{CN1}$), current compensation circuit 280 and current mirror output circuit 295. Control circuit 250 works as follows.

Current mirror output circuit 295 is a current mirror circuit including transistor 296 and transistor 298 (having its gate 298A connected to its drain 298B). Circuit 295 accepts a controlled reference current $I_{CREF}$ at input 295A and provides a proportional output current $I_{CON}$ related to the aspect ratios of transistor 296 and 298 (as in conventional current mirror circuits). In accordance with the present invention, $I_{CREF}$ will be equal to either $I_{CN1}$ or ($I_{CN1}+I_{CN2}$) depending upon voltages $V_{IN}$ and $V_{OUT}$ on input terminals 252 and 254, respectively.

When $V_{IN}-V_{OUT}$ is greater than 1.5 volts, transistor 262 conducts sufficient current (from transistor 264 and current supply $I_6$) to hold transistor 266 OFF. With transistor 266 OFF, current $I_{CN2}$ will be zero and current $I_{CREF}$ will therefore be equal to current $I_{CN1}$ provided at output terminal 270A of current source 270.

Current $I_{CN1}$ is supplied by a current mirror circuit composed of transistor 272 and transistor 274 (having its gate 274A connected to its drain 274B). In accordance with the present invention, the reference current $I_{CN1REF}$ flowing from transistor 274 will be equal to either $I_{CN1A}$ or ($I_{CN1A}+I_{CN1B}$), depending upon whether transmission gate 282 is open or closed, respectively.

Transmission gate 282 is controlled by comparator 284 and will be OPEN when $V_{OUT}$ is less than $V_{TH3}$. Under OPEN conditions, $I_{CN1REF}$ will be equal to $I_{CN1A}$ which goes to the collector of transistor 276. This current is derived by dividing $V_{OUT}$ by the output divider (composed of resistors 271 and 273) to produce voltage $V_{FB1}$ (at the base of transistor 279). Voltage $V_{FB1}$ is then level shifted up by the base-emitter voltage of transistor 279 and then down by the base-emitter voltage of transistor 276 where it appears across emitter resistor 278. The resulting transistor 276 collector current is then proportional to the output voltage $V_{OUT}$, causing control capacitor $C_{CON}$ to be discharged at a rate which is proportional to the discharge rate of the current in inductor L1.

Thus, when the output voltage $V_{OUT}$ is low, such as during a fault or start-up condition, $t_{OFF}$ will be lengthened to allow the additional time required for the current to ramp down in inductor L1.

When the output voltage $V_{OUT}$ is greater than $V_{TH3}$, the output of comparator 284 closes transmission gate 282 to couple an additional compensation current $I_{CN1B}$ to the drain of transistor 274 to provide current compensation through current compensation circuit 280. Compensation current $I_{CN1B}$ is equal to current $I_{TRIM}$ minus the drain current of transistor 286. Transistors 286 and 288 serve to mirror the collector current in transistor 290 (which is derived in a similar manner to the collector current in transistor 276 discussed above, except that voltage $V_{REF}$ is used instead of voltage $V_{FB1}$).

Compensation current $I_{CN1B}$ has two purposes: 1) to serve as a trimming current to set a desired control current $I_{CON}$ when the output voltage $V_{OUT}$ is substantially at its regulated level, and 2) to maintain a substantially constant control current $I_{CON}$ over a wide range of operating temperatures. During typical circuit manufacturing, variations in the resistance of resistor 278 would normally cause control current $I_{CON}$ to be larger or smaller than desired. By trimming $I_{TRIM}$ while in production, compensation current $I_{CN1B}$ can be adjusted to add or subtract from the collector current ($I_{CN1A}$) of transistor 276 as required to provide a predetermined control current $I_{CON}$. Additionally, if resistors 278 and 292 are matched (i.e., designed and fabricated similarly), then control current $I_{CON}$ variations due to the temperature variation of the resistance of resistor 278 will be substantially cancelled by a corresponding change in the resistance of resistor 292.

If the output voltage $V_{OUT}$ is less than voltage $V_{TH3}$, the output of comparator 284 opens transmission gate 282 and thus inhibits current compensation. This ensures that control current $I_{CON}$ will approach zero as the output voltage $V_{OUT}$ approaches zero, thus guaranteeing control of the inductor current $I_L$ during an output short circuit.

When $V_{IN}$ falls to the point that $V_{IN}-V_{OUT}$ is less than 1.5 volts, the current in transistor 262 no longer holds transistor 266 OFF. As $V_{IN}$ decreases further, transistor 266 adds additional current ($I_{CN2}$) into current mirror output circuit 295, thereby increasing control current $I_{CON}$ and, thus, reducing $t_{OFF}$. This in turn stabilizes the operating frequency as $V_{IN}$ decreases, reducing potential audibility problems. Current source $I_7$ determines the maximum current that transistor 266 adds to control current $I_{CON}$.

Thus, when $V_{IN}$ falls so that $V_{IN}-V_{OUT}$ is less than 1.5 volts (e.g., when a battery is nearly discharged), $t_{OFF}$ will be reduced to increase the oscillation frequency of the regulator circuit so that the generation and emission of audible noise is reduced.

Although variable OFF-time control circuit 250 was discussed above with respect to a regulator circuit which includes push-pull switch 15 and driver 20, it will be apparent that the variable OFF-time feature of the present invention could be used in other regulators as well. For example, this feature could also be used in the regulator circuits of FIGS. 3 and 4 and other circuits that employ one-shot generators to provide a regulated voltage.

Figure 7:
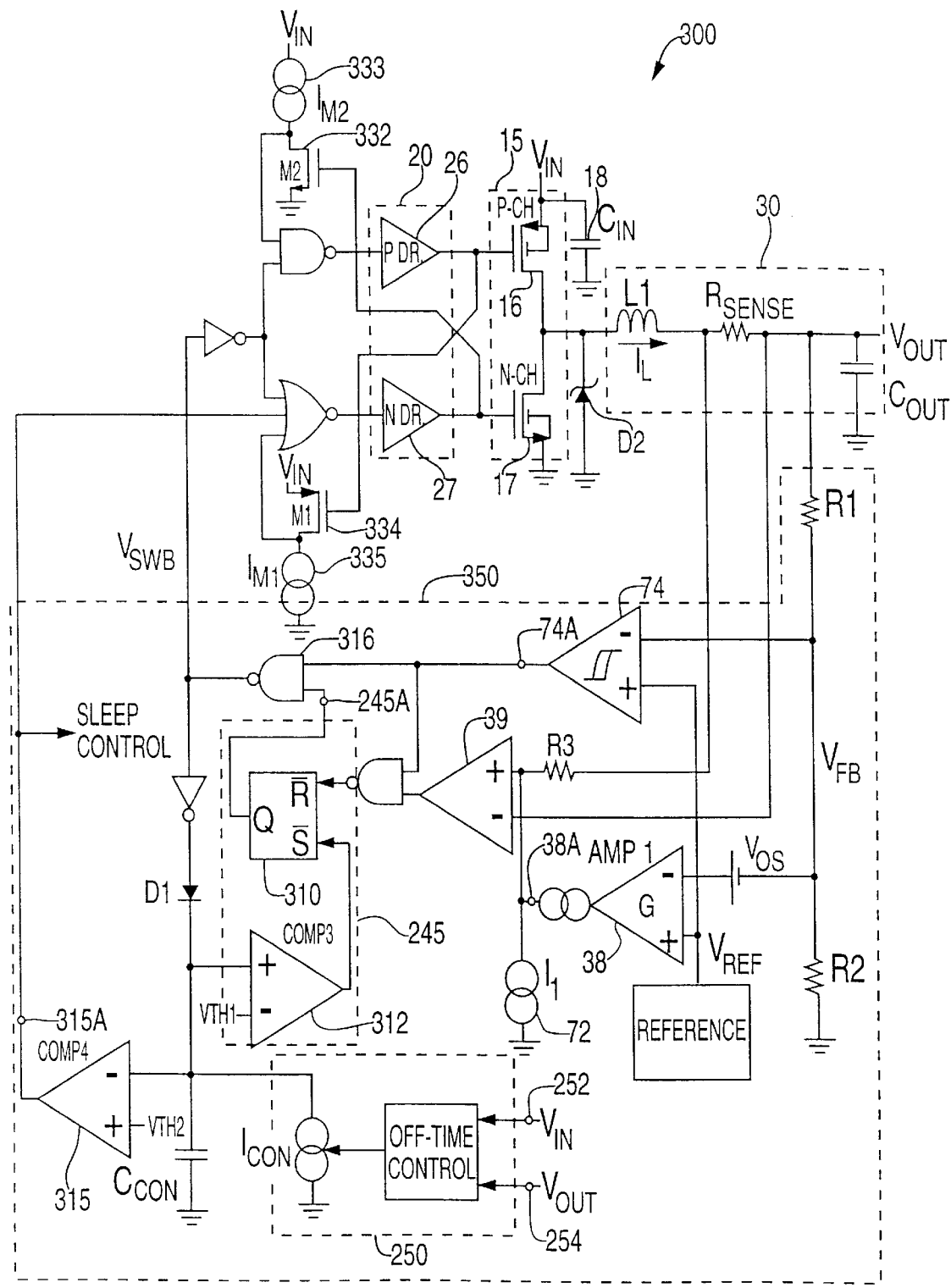
FIG. 7 is a detailed schematic block diagram of an exemplary switching regulator circuit incorporating both the variable OFF-time feature and the high-efficiency control circuit of the present invention to drive a switch including a pair of synchronously-switched MOSFETs in a step-down configuration.

FIG. 7 is a detailed schematic block diagram of an exemplary switching regulator circuit incorporating both the variable OFF-time feature and the high-efficiency control circuit of the present invention to drive a switch including a pair of synchronously-switched MOSFETs in a step-down configuration.

Switching regulator 300 includes push-pull switch 15, driver 20, output circuit 30 and control circuit 350. Control circuit 350 includes one-shot generator 245, variable OFF-time control circuit 250 for controlling the OFF cycle time and comparator 74 for providing high-efficiency operation at low average output current levels. Switching regulator 300 works as follows.

When the load current exceeds, for example, approximately 20 percent of the maximum output current, the loop operates in a continuous mode wherein comparator 74 does not override output 245A of one-shot generator 245. With $V_{IN}-V_{OUT}$ greater than 1.5V, operation is substantially similar to that described for FIG. 1. The inductor current is sensed by means of the voltage drop across resistor $R_{SENSE}$, and the threshold for the current comparator 39 is set by the voltage drop across resistor $R_3$. Built-in offset $V_{OS}$ (e.g., about 10 mv) levelshifts feedback voltage $V_{FB}$ slightly below reference voltage $V_{REF}$, thus keeping the output of comparator 74 HIGH in this mode. When the voltage across resistor $R_{SENSE}$ exceeds the threshold across resistor $R_3$, the output of comparator 39 goes HIGH and the RBAR input of RS flip-flop 310 goes LOW, resetting RS flip-flop 310, and thus, initiating the switch OFF cycle.

During the OFF cycle, switch signal $V_{SWB}$ is HIGH, which turns P-MOSFET 16 OFF, N-MOSFET 17 ON and allows $I_{CON}$ to discharge control capacitor $C_{CON}$. The OFF time, $t_{OFF}$, is in turn determined by the time it takes control capacitor $C_{CON}$ to discharge from its initial voltage to $V_{TH1}$, coupled to the non-inverting input of comparator 312. When control capacitor $C_{CON}$ discharges to voltage $V_{TH1}$, the output of comparator 312 goes LOW, thus setting RS flip-flop 310 and initiating the next ON cycle. Voltage $V_{TH1}$ is higher than voltage $V_{TH2}$, thus causing the output of comparator 315 to remain LOW in the continuous mode.

In accordance with present embodiment, the OFF time is controlled by variable OFF-time control circuit 250 described above with respect to FIGS. 5 and 6. Accordingly, circuit 250 includes inputs 252 and 254 coupled to $V_{IN}$ and $V_{OUT}$, respectively, to monitor those voltages.

Current source $I_1$ sets a minimum voltage threshold across resistor $R_3$ for current comparator 39. This sets a minimum current required in inductor L1 during each ON cycle to trip comparator 39. If the resulting average inductor current flowing to the output is greater than the load current, then output voltage $V_{OUT}$ will begin to increase, causing feedback voltage $V_{FB}$ to trip the hysteretic comparator 74. Of course, the inductance of inductor L1 and OFF time $t_{OFF}$ are preferably chosen so that the inductor ripple current is not below zero when such tripping occurs. When comparator 74 trips, its output goes LOW and overrides the Q output of RS flip-flop 310, immediately switching switch signal $V_{SWB}$ high. As discussed above, this automatically initiates the beginning of the "sleep" mode of operation.

In sleep mode, capacitor $C_{CON}$ discharges as before, but does not initiate a new switch ON cycle when comparator 312 trips. As discussed above, this is because until feedback voltage $V_{FB}$ has fallen by the amount of hysteresis in comparator 74, the LOW at output 74A forces switch signal $V_{SWB}$ to remain HIGH through NAND gate 316. Accordingly, control capacitor $C_{CON}$ continues to discharge below voltage $V_{TH2}$, causing output 315A of comparator 315 to go HIGH. This in turn causes the N-MOSFET 17 as well as the P-MOSFET 16 to be turned OFF. In addition, unused circuit components such as amplifier 38 and comparators 39 and 312 are also turned OFF when the regulator circuit is in sleep mode. As discussed above, this decreases bias currents substantially during sleep mode, further increasing efficiency at low output current levels.

During the extended off times in sleep mode, much of the regulator and both MOSFETS 16 and 17 are turned off, and the output load is supported substantially by output capacitor $C_{OUT}$. However, when the output voltage $V_{OUT}$ falls such that the feedback voltage $V_{FB}$ has decreased by the amount of hysteresis in comparator 74, all circuit components are again turned on and a new ON cycle is initiated to supply current to the output. If the load current remains low, output capacitor $C_{OUT}$ will recharge, and the feedback voltage $V_{FB}$ will again trip comparator 74 after only a few switch cycles. Thus, during light load conditions, the output voltage $V_{OUT}$ will oscillate between upper and lower thresholds values, as discussed above.

Whenever P-MOSFET 16 is ON, its gate-to-source voltage also appears across MOSFET 334, turning MOSFET 334 ON. This pulls the drain of MOSFET 334 HIGH, and inhibits N-drive 27. Following a LOW-to-HIGH $V_{SWB}$ transition, the voltage on the gate of P-MOSFET 16 must rise to a level where MOSFET 334 is conducting less than current source 335 before the drain voltage of MOSFET 334 falls and allows the N-MOSFET 17 to be turned ON. Current $I_{M1}$ is purposely made small so that the gate of MOSFET 334 must rise to within 2 volts of the input voltage $V_{IN}$ before the drive is enabled, ensuring that the P-MOSFET is completely OFF when N-MOSFET 17 turns ON. In a similar manner, MOSFET 332 and current source $I_{M2}$ 333 ensure that the N-MOSFET 17 is completely OFF when the P-MOSFET 16 turns ON. This prevents simultaneous conduction regardless of the driver speeds or MOSFET sizes, ensuring maximum possible efficiency. This feature of the present embodiment is discussed in more detail in copending commonly-assigned U.S. patent application Ser. No. 07/893,523, filed Jun. 4, 1992, now U.S. Pat. No. 5,365,118 which is hereby incorporated by reference in its entirety. If desired, the control circuit of the present invention can also include circuitry for accommodating transient switch signals as described in copending commonly-assigned U.S. patent application Ser. No. 08/035,423, filed concurrently herewith, now U.S. Pat. No. 5,408,150, which is also hereby incorporated by reference in its entirety.

Schottky diode D2 coupled across N-MOSFET 17 shown in FIG. 7 only conducts during the deadtime between the conduction of MOSFETS 16 and 17. Diode D2's purpose is to prevent the body diode of N-MOSFET 17 from turning on and storing charge during the deadtime, which could reduce efficiency (e.g., by approximately 1 percent) in some cases. Diode D2 preferably is selected with a forward voltage of less than about 0.5 volts when conducting the maximum output current.

In accordance with the present invention, the control circuit shown in FIG. 7, when incorporated into a 5-volt synchronous step-down switching regulator, is capable of achieving over 90 percent efficiency (for an input voltage of approximately 10 volts) while the output current varies over two orders of magnitude (e.g., 20 mA to 2 A). Under some operating conditions (e.g., for an input voltage of 6 volts) efficiencies of over 95 percent can be maintained over such current levels. Such a control circuit is particularly useful in notebook and palm-top computers, portable instruments, battery-operated digital devices, cellular telephones, DC power distributions systems and GPS systems.

As discussed above with respect to FIG. 1, a disadvantage of prior art control circuit 10 is that at low output currents the current in inductor L1 may reverse polarity if during $t_{OFF}$ the current ramps down too much. This may result in power being pulled from the load to ground, through N-MOSFET 17, with an associated reduction in circuit efficiency. In accordance with a still further feature of the present invention, the control circuit can include a circuit for turning OFF the N-MOSFET to prevent such power from being pulled from the load if the inductor current reverses polarity.

Figure 8:
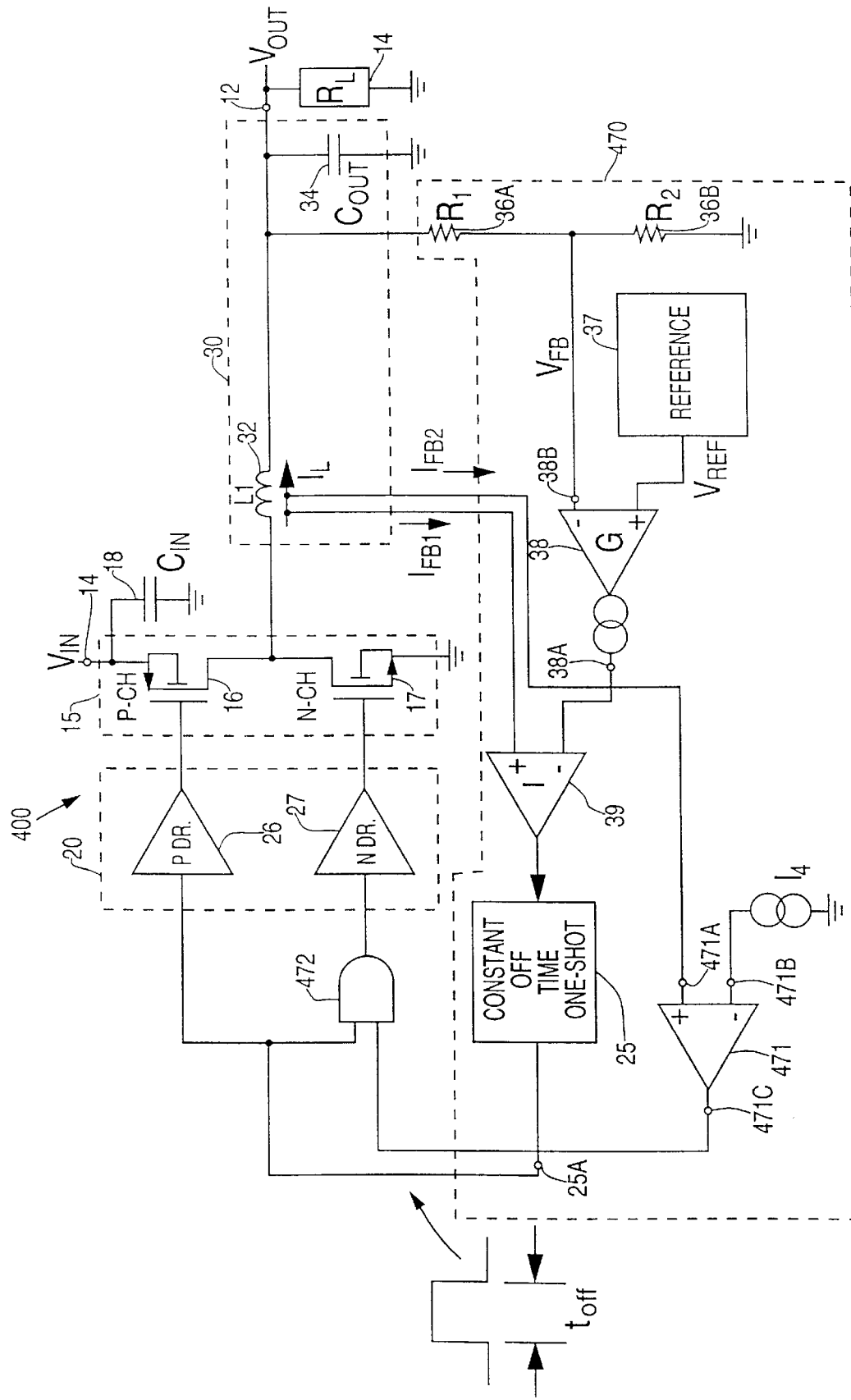
FIG. 8 is a schematic block diagram of a switching regulator circuit incorporating a circuit of the present invention for preventing reversals in the polarity of the current in the output inductor of the regulator from drawing power from the load.

FIG. 8 is a schematic block diagram of an exemplary switching regulator circuit incorporating a circuit of the present invention for preventing reversals in the polarity of the current in the output inductor of the regulator from drawing power from the load.

Switching regulator 400 includes push-pull switch 15, driver circuit 20 and output circuit 30 similar to those of FIG. 1. Circuit 400 also includes an embodiment 470 of the high-efficiency control circuit of the present invention for preventing reversals in the polarity of output inductor L1 current from drawing power from the load.

Control circuit 470 includes one-shot circuit 25, current comparator 39 and transconductance amplifier 38 similar to those of FIG. 1. In addition to those components, control circuit 470 also includes comparator 471 and gate 472 for preventing reversals in inductor current polarity from drawing power from the load at low average current levels. Control circuit 470 works as follows.

When output 25a of one-shot circuit goes HIGH to turn P-MOSFET 16 OFF and N-MOSFET 17 ON, the inductor current $I_L$ begins to ramp down. During low average output currents, this current may ramp down towards zero and, eventually, may go negative. Control circuit 470 works by monitoring the inductor current $I_L$, through current feedback signal $I_{FB2}$, and turns N-MOSFET 17 OFF before such current reversals can occur. This prevents N-MOSFET 17 from drawing power from the load to ground.

Comparator 471 includes an input 471a adapted to monitor inductor current $I_L$ by way of current feedback signal $I_{FB2}$. When current feedback signal $I_{FB2}$ falls below current $I_4$ applied to input 471b of comparator 471, comparator output 471c goes LOW and, therefore, turns N-MOSFET 17 OFF by way of NAND gate 472. The turning OFF of N-MOSFET 17 prevents current reversals in inductor current $I_L$ from drawing power from load 14 to ground through N-MOSFET 17.

After N-MOSFET 17 is turned OFF, it will again be allowed to turn ON as soon as feedback current $I_{FB2}$ exceeds current $I_4$ to cause comparator output 471c to go HIGH. Generally, comparator output 471c will again go HIGH after one-shot circuit 25 turns P-MOSFET 16 ON, which, in turn, causes the inductor current $I_L$ to again ramp up. Such ramping up will allow current feedback signal $I_{FB2}$ to exceed $I_4$ and, therefore, cause comparator output 471c to go HIGH. While comparator 471c is HIGH, one-shot circuit 25 solely controls the turning ON of N-MOSFET 17.

Thus, control circuit 470 includes circuitry for intentionally holding N-MOSFET 17 OFF during periods when current reversals would otherwise allow power to be drawn from the load. This feature of the present invention can increase circuit efficiency at low average output current levels when current reversals are most like to occur.

It will be apparent to those of ordinary skill in the art that although comparator 471 monitors the inductor current $I_L$ through feedback current $I_{FB2}$, other means of detecting current reversals in the inductor current $I_L$ could be used as well. For example, comparator 471 could monitor current feedback signal $I_{FB1}$ just as well so that only one type of current feedback signal is employed in control circuit 470. Additionally, many others means of generating a feedback signal indicative of current reversal in inductor current $I_L$ could be used as well (see, e.g., resistor $R_{SENSE}$ in FIG. 7).

The high-efficiency control circuit of the present invention was discussed above with respect to FIGS. 1–8 wherein the switching regulator was configured in a voltage step-down configuration. It will be apparent that the control circuit of the present invention could be used in other configurations as well. For example, FIG. 9 shows a schematic block diagram of a switching regulator circuit incorporating the high-efficiency control circuit of the present invention in a voltage step-up configuration.

Switching regulator 500 includes synchronously-switched switch 15' wherein the drains of P-channel MOSFET 16 and N-channel MOSFET 17 are coupled together and to one side of inductor L1. The other side of inductor L1 is coupled to input $V_{IN}$. Control circuit 70 drives driver circuit 20' including inverting P-driver 26' and inverting N-driver 27', which in turn drive P-channel MOSFET 16 and N-channel MOSFET 17, respectively.

Figure 9:
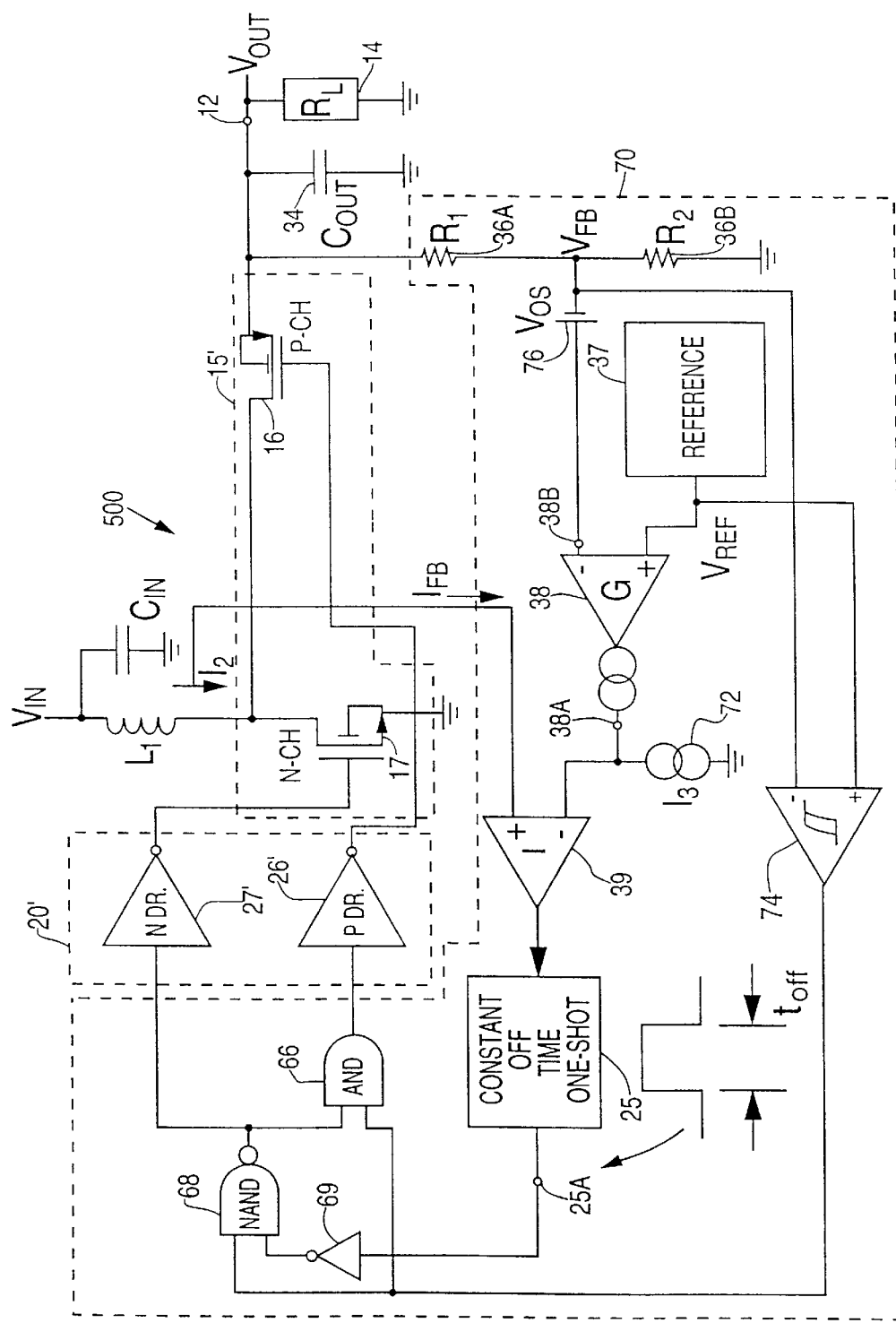
FIG. 9 is a schematic block diagram of a switching regulator circuit incorporating the high-efficiency control circuit of the present invention in a step-up configuration.

Thus, as shown in FIG. 9, the control circuit of the present invention can be used in switching configurations wherein an input voltage $V_{IN}$ is stepped up to a regulated output voltage $V_{OUT}$. As is the case with the step-down configurations shown in FIGS. 2–8, the control circuit of FIG. 9 can be used in other types of step-up configurations as well. For example, one-shot circuit 25 shown in FIG. 9 can include an additional input for monitoring the input voltage $V_{IN}$ to reduce the generation and emission of audible noise from inductor L1 at low input voltages as discussed above with respect to FIGS. 5 and 6. Also, switching regulator 500 can include circuitry to hold P-MOSFET 16 OFF during periods when the polarity of inductor current $I_L$ would otherwise reverse, as discussed above with respect to FIG. 8.

Figure 10:
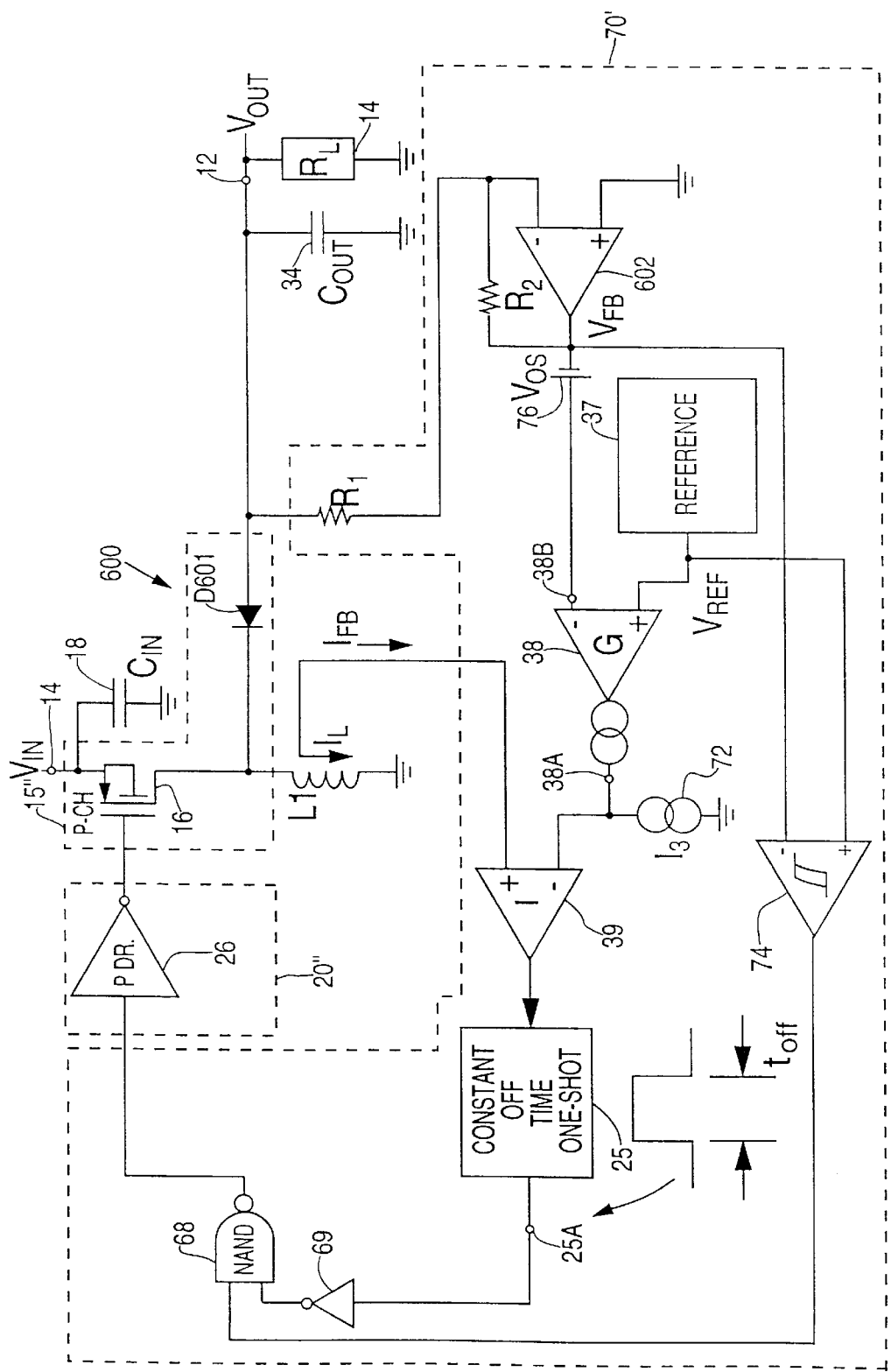
FIG. 10 is a schematic block diagram of a switching regulator circuit incorporating the high-efficiency control circuit of the present invention in a polarity-reversing configuration.

FIG. 10 shows a schematic block diagram of a switching regulator circuit incorporating the high-efficiency control circuit of the present invention in a voltage polarity-inversing configuration.

Switching regulator 600 includes switch 15" wherein the drain of P-channel MOSFET 16 is coupled to one side of inductor L1 and to $V_{OUT}$ through diode D601. The other side of inductor L1 is coupled to ground. The source of P-channel MOSFET 16 is coupled to the positive input voltage $V_{IN}$. Control circuit 70' drives driver circuit 20" including P-driver 26 which, in turn, drives P-channel MOSFET 16.

Control circuit 70' operates substantially similar to control circuit 70 discussed above except for the following. Voltage feedback to control circuit 70' is provided by resistors R1 and R2 and amplifier 602. Amplifier 602 inverts the negative polarity voltage at $V_{OUT}$ to provide a positive polarity feedback voltage to control circuit 70'.

Thus, as shown in FIG. 10, the control circuit of the present invention can be used in switching configurations wherein an input voltage $V_{IN}$ is inverted to a regulated output voltage of opposite polarity $V_{OUT}$. As is the case with the step-down configurations shown in FIGS. 2–8, the control circuit of FIG. 10 can be used in other types of polarity-inversing configurations as well. For example, one-shot circuit 25 shown in FIG. 10 can include an additional input for monitoring the input voltage $V_{IN}$ to reduce the generation and emission of audible noise from inductor L1 at low input voltages. Furthermore, one-shot circuit 25 can include an input for monitoring the output voltage $V_{OUT}$ to control the short circuit current if the output is short circuited as discussed above with respect to FIGS. 5 and 6. Also, if regulator 600 was synchronously switched and included an N-MOSFET instead of D601, the regulator could include circuitry to hold such an N-MOSFET OFF during periods when the polarity of inductor current $I_L$ would otherwise reverse, as discussed above with respect to FIG. 8.

It will be apparent to those of ordinary skill in the art that although the present invention has been discussed above with reference to a hysteretic voltage comparator for generating the sleep mode control signal to cause the switching regulator to go into and awake from the sleep-mode, other means for performing the same function are also possible. For example, if desired, the sleep mode control signal could be generated in response to a monitored output current. Furthermore, the switching regulator could be taken out of the sleep mode a predetermined time period after going into such a mode, instead after the output voltage falls below a predetermined threshold voltage, as illustrated above.

It will also be apparent that although the present invention has been discussed above with reference to FIGS. 1–10, wherein the power switches were either a pair of complementary MOSFETS (i.e., one p-channel and one n-channel) or a single p-channel MOSFET (FIG. 3), the present invention is applicable to other types of switches as well. For example, the power switch could include a pair of N-channel MOSFETS, a pair of P-channel MOSFETS, or bipolar junction transistors.

Thus, a control circuit and method for maintaining high efficiency over broad current ranges in a switching regulator circuit has been provided.

One skilled in the art will thus appreciate that the present invention can be practiced by other than the described embodiments, which are presented for purposes of illustration and not of limitation, and the present invention is limited only by the claims which follow.

What is claimed is:

1. A circuit for controlling a switching voltage regulator having a switch and an output adapted to supply current at a regulated voltage to a load including an output capacitor, the switch coupled between an input voltage and an output voltage and including one or more switching transistors, the circuit comprising:

a first circuit for monitoring an output to generate a first feedback signal;

a second circuit for generating a first control signal during a first state of circuit operation, the second circuit including a one-shot circuit that generates the first control signal to switch the one or more switching transistors "on" or "off" over a first period of time to maintain the output at the regulated voltage, the one-shot circuit being triggered responsive to the first feedback signal, the first period of time being responsive to at least one of the input voltage and the output voltage.

2. The circuit of claim 1, wherein the first period of time is responsive to the input voltage.

3. The circuit of claim 2, wherein:

the switch is coupled to an inductor;

the first period of time is decreased in response to a decrease in the input voltage; and an oscillation frequency of the ripple current through the inductor is increased from an audible frequency to one that does not generate substantial user audible noise.

4. The circuit of claim 1, wherein the first period of time is responsive to the output voltage.

5. The circuit of claim 4, wherein:

the switch is coupled to an inductor;

the first period of time is increased in response to a decrease in the output voltage; and the total decrease in current through the inductor is increased while the first control signal is generated.

6. The circuit of claim 1, wherein the circuit includes a capacitor coupled to the one-shot circuit and a variable current source for controlling the discharging rate of the capacitor, the discharging rate being responsive to at least one of the input voltage and the output voltage to control the first period of time.

7. The circuit of claim 6, wherein the first period of time is responsive to the input voltage.

8. The circuit of claim 7, wherein:

the switch is coupled to an inductor;

the first period of time is decreased in response to a decrease in the input voltage; and an oscillation frequency of the ripple current through the inductor is increased from an audible frequency to one that does not generate substantial user audible noise.

9. The circuit of claim 6, wherein the first period of time is responsive to the output voltage.

10. The circuit of claim 9, wherein:

the switch is coupled to an inductor;

the first period of time is increased in response to a decrease in the output voltage; and the total decrease in current through the inductor is increased while the first control signal is generated.

11. A switching voltage regulator that generates an output at an output node from an input at an input node, the output node coupled to an output capacitor, the regulator comprising:

a switching transistor having a first terminal coupled to the input node, a second terminal, and a third terminal;

a driver circuit having a first terminal, and a second terminal coupled to the second terminal of the switching transistor;

an inductor having a first terminal coupled to the third terminal of the switching transistor, and a second terminal coupled to the output node;

a feedback circuit having a first terminal coupled to the output node, and a second terminal, the feedback circuit producing a feedback signal at the second terminal of the feedback circuit;

a feedback control circuit having a first terminal coupled to the second terminal of the feedback circuit, and a second terminal, the feedback control circuit producing a trigger signal at the second terminal of the feedback control circuit, said trigger signal being produced responsive to the feedback signal;

an off-time control circuit having a first terminal and a second terminal, the off-time control circuit producing an off-time control signal at the first terminal of the off-time control circuit, the second terminal of the off-time control circuit being coupled to one of the input node or the output node;

a one-shot generator having a first terminal coupled to the second terminal of the feedback control circuit, a second terminal coupled to the first terminal of the off-time control circuit, and a third terminal coupled to the first terminal of the driver circuit, the one-shot generator generating a switch signal on the third terminal to cause the driver to place the switching transistor in an off state starting upon receipt of the trigger signal, and continuing for a first period of time determined by the off-time control signal.

12. The regulator of claim 11, wherein the feedback circuit produces a voltage feedback signal at the second terminal of the feedback circuit.

13. The regulator of claim 11, wherein the feedback circuit produces a current feedback signal at the second terminal of the feedback circuit.

14. The regulator of claim 13, wherein the regulator further comprises a voltage feedback circuit having a first terminal coupled to the output node, and a second terminal, the voltage feedback circuit producing a voltage feedback signal at the second terminal of the voltage feedback circuit, and wherein the feedback control circuit has a third terminal coupled to the second terminal of the voltage feedback circuit, and the trigger signal is produced responsive to the current feedback signal and the voltage feedback signal.

15. The regulator of claim 11, wherein the second terminal of the off-time control circuit is coupled to the input node, and the off-time control signal is generated responsive to a voltage at the input node to vary the first period of time.

16. The regulator of claim 15, wherein the off-time control circuit produces an off-time control signal that decreases the first period of time in response to a decrease in the voltage at the input node, whereby an oscillation frequency of the ripple current through the inductor is increased from an audible frequency to a substantially inaudible frequency.

17. The regulator of claim 11, wherein the second terminal of the off-time control circuit is coupled to the output node, and the off-time control signal is generated responsive to a voltage at the output node to vary the first period of time.

18. The regulator of claim 17, wherein the off-time control circuit produces an off-time control signal that increases the first period of time in response to a decrease in the voltage at the output.

19. The regulator of claim 11, wherein the second terminal of the off-time control circuit is coupled to the input node and the off-time control circuit further comprises a third terminal coupled to the output node, and the off-time control signal is generated responsive to a voltage at the input node and a voltage at the output node to vary the first period of time.

20. The regulator of claim 11, wherein the one-shot generator includes a control capacitor coupled between the second terminal of the one-shot generator and ground, and the off time control circuit comprises a variable current source that controls the discharging rate of the control capacitor.

21. The regulator of claim 20, wherein the second terminal of the off-time control circuit is coupled to the input node, and the variable current source controls the discharging rate of the control capacitor responsive to a voltage at the input node to vary the first period of time.

22. The regulator of claim 21, wherein the variable current source controls the discharging rate of the control capacitor to decrease the first period of time in response to a decrease in the voltage at the input node, whereby an oscillation frequency of the ripple current through the inductor is increased from an audible frequency to a substantially inaudible frequency.

23. The regulator of claim 20, wherein the second terminal of the off-time control circuit is coupled to the output node, and the variable current source controls the discharging rate of the control capacitor responsive to a voltage at the output node to vary the first period of time.

24. The regulator of claim 23, wherein the variable current source controls the discharging rate of the control capacitor to increase the first period of time in response to a decrease in the voltage at the output node.

25. The regulator of claim 20, wherein the second terminal of the off-time control circuit is coupled to the input node and the off-time control circuit further comprises a third terminal coupled to the output node, and the variable current source controls the discharging rate of the control capacitor responsive to a voltage at the input node and a voltage at the output node to vary the first period of time.

26. The regulator of claim 25, wherein the off-time control circuit comprises a control circuit that produces a control current to control the variable current source responsive to a voltage at the input node and a voltage at the output node to vary the first period of time.

27. The regulator of claim 26, wherein the control circuit comprises:
   a first current source, providing a first current;
   a second current source, providing a second current;
   a current compensation circuit; and
   a current mirror output circuit that outputs the control current.

28. The regulator of claim 27, wherein the current mirror output circuit produces a current proportional to the first current, or to the sum of the first current and the second current, depending on the voltage at the input node and the voltage at the output node.

29. The regulator of claim 27, wherein the second current source causes the second current to be zero when a difference between the voltage at the input node and a voltage at the output node is greater than a predetermined value.

30. The regulator of claim 29, wherein the second current increases responsive to a decrease in the voltage at the input node when the difference between the voltage at the input node and the voltage at the output node is less than the predetermined value.

31. The regulator of claim 27, wherein the current compensation circuit adjusts the control current to compensate for changes in temperature.

32. A circuit for controlling a switching voltage regulator having a switch and an output adapted to supply current at a regulated voltage to a load including an output capacitor, the switch coupled between an input voltage and an output voltage and including one or more switching transistors, the circuit comprising:
   means for generating a current feedback signal;
   means for generating a voltage feedback signal;
   means for generating a trigger signal responsive to the current feedback signal and the voltage feedback signal;
   means for generating an off-time control signal responsive to at least one of the input voltage and the output voltage; and
   one-shot means for placing the switch into an off state responsive to the trigger signal, the switch remaining-in the off state for a period of time responsive to the off-time control signal.

33. The circuit of claim 31, wherein the means for generating the off-time control signal causes the period of time to decreases in response to a decrease in the input voltage.

34. The circuit of claim 31, wherein the means for generating the off-time control signal causes the period of time to increase in response to a decrease in the output voltage.

35. A switching voltage regulator having an output node and an input node, the output node coupled to an output capacitor, the regulator comprising:
   a switching transistor having a first terminal coupled to the input node, a second terminal, and a third terminal;
   a driver circuit having a first terminal, and a second terminal coupled to the second terminal of the switching transistor;
   an inductor having a first terminal coupled to the third terminal of the switching transistor, and a second terminal coupled to the output node;
   a feedback circuit having a first terminal coupled to the output node, and a second terminal;
   a feedback control circuit having a first terminal coupled to the second terminal of the feedback circuit, and a second terminal;
   a one-shot generator having a first terminal coupled to the second terminal of the feedback control circuit, a second terminal, and a third terminal coupled to the first terminal of the driver circuit, the one-shot generator including a control capacitor coupled between the second terminal of the one-shot generator and ground;
   an off-time control circuit having a first terminal coupled to the second terminal of the one-shot generator, and a second terminal coupled to one of the input node or the output node, the off-time control circuit including a variable current source that controls the discharging rate of the control capacitor.

36. The regulator of claim 35, wherein the feedback circuit comprises a voltage feedback circuit.

37. The regulator of claim 35, wherein the feedback circuit comprises a current feedback circuit.

38. The regulator of claim 37, wherein the regulator further comprises a voltage feedback circuit having a first terminal coupled to the output node, and a second terminal, and wherein the feedback control circuit has a third terminal coupled to the second terminal of the voltage feedback circuit.

39. The regulator of claim 35, wherein the off-time control circuit further comprises a second terminal coupled to the input node, and the off time control signal is generated responsive to a voltage at the input node to vary the first period of time.

40. The regulator of claim 35, wherein the second terminal of the off-time control circuit is coupled to the input node.

41. The regulator of claim 35, wherein the second terminal of the off-time control circuit is coupled to the output node.

42. The regulator of claim 35, wherein the second terminal of the off-time control circuit is coupled to the input node and the off-time control circuit further comprises a third terminal coupled to the output node.

* * * * *